(12) United States Patent
Nica

(10) Patent No.: US 7,184,998 B2
(45) Date of Patent: Feb. 27, 2007

(54) SYSTEM AND METHODOLOGY FOR GENERATING BUSHY TREES USING A LEFT-DEEP TREE JOIN ENUMERATION ALGORITHM

(75) Inventor: Anisoara Nica, Waterloo (CA)

(73) Assignee: Sybase, Inc., Dublin, CA (US)

( * ) Notice: Subject to any disclaimer, the term of this patent is extended or adjusted under 35 U.S.C. 154(b) by 508 days.

(21) Appl. No.: 10/600,932

(22) Filed: Jun. 20, 2003

(65) Prior Publication Data

US 2004/0006561 A1 Jan. 8, 2004

Related U.S. Application Data

(60) Provisional application No. 60/392,479, filed on Jun. 29, 2002.

(51) Int. Cl.
G06F 7/00 (2006.01)
G06F 17/30 (2006.01)

(52) U.S. Cl. .............................. 707/2; 707/4
(58) Field of Classification Search ............. 707/2, 707/3, 4; 395/602
See application file for complete search history.

(56) References Cited

U.S. PATENT DOCUMENTS 5,694,591 A * 12/1997 Du et al. .................. 707/2
2004/0220923 A1 * 11/2004 Nica ......................... 707/3

OTHER PUBLICATIONS

Bowman et al., "Join Enumeration in a Memory-Constrained Environment", Proceedings, 16th IEEE Data Engineering Conference, San Diego, California; Mar. 2000.*
Du et al., "Reducing Multidatabase Query Response Time By Tree Balancing", Proceedings of the 1995 ACM SIGMOD; May 1995.*
Chu et al., "Least Expected Cost Query Optimization: An Exercise in Utility", SIGMOD; 1999.*
Graefe et al., "The Volcano Optimizer Generator: Extensibility and Efficient Search", Proceedings of the Ninth IEEE Conference on Data Engineering, 1993.*
Steinebrunn, M. et al, Heuristic and Randomized Optimization for the Join Ordering Problem, VLDB Journal, vol. 6: 191-208, 1997.
Vance, B. et al, Rapid Bushy Join-Order Optimization with Cartesian Products, Proceedings of ACM SIGMOD Conference of Management of Data, pp. 35-46, Jun. 1996.
Cluet, S. et al, On the Complexity of Generating Optimal Left-Deep Processing Trees with Cross Products, Proceedings of the Fifth International Conference on Database Theory, pp. 54-67, Jan. 1995.
Galindo-Legaria, C., Uniformly-Distributed Random Generation of Join Orders, Proceedings of the International Conference on Database Theory, pp. 280-293, Jan. 1995.
Galindo-Legaria, C. et al, Fast, Randomized Join-order Selection—Why Use Transformations?, Proceedings of the International Conference on Very Large Data Bases, pp. 85-95, Sep. 1994.
Swami, A. et al, A Polynomial Time Algorithm for Optimizing Join Queries, Proceedings of the IEEE Conference of Data Engineering, pp. 345-354, Apr. 1993.

(Continued)

Primary Examiner—Jeffrey Gaffin
Assistant Examiner—Michael J. Hicks
(74) Attorney, Agent, or Firm—John A. Smart; G. Mack Riddle

(57) ABSTRACT

A system and methodology for generating bushy trees using a left-deep tree join enumeration strategy for optimizing execution of a database query is described. In response to receipt of a query specifying at least one join condition between two or more database tables, each query block comprising an atomic portion of the query is identified and subplans are created for each query block based on grouping portions of each query block. At least one favorable access plan is determined for each subplan of each query block based, at least in part, on estimated execution costs. An optimal access plan for each query block is generated based upon at least one favorable access plan determined for each subplan. A query execution plan is then constructed based upon the optimal access plan generated for each query block.

47 Claims, 13 Drawing Sheets

OTHER PUBLICATIONS

Ono, K. et al, Measuring the Complexity of Join Enumeration in Query Optimization, Proceedings of the 16th International Conference on Very Large Data Bases, pp. 314-325, Aug. 1990.

Ioannidis, Y.E. et al, Randomized Algorithms for Optimizing Large Join Queries, Proceedings of ACM SIGMOD Conference of Management of Data, pp. 312-321, Apr. 1990.

Swami, A., Optimization of Large Join Queries: Combining Heuristics and Combinatorial Techniques, Proceedings of ACM SIGMOD Conference of Management of Data, pp. 367-376, May 1989.

Swami, A. et al, Optimization of Large Join Queries, Proceedings of ACM SIGMOD Conference of Management of Data, pp. 8-17, May 1988.

Ioannidis, Y.E. et al, Query Optimization by Simulated Annealing, Proceedings of ACM SIGMOD Conference of Management of Data, pp. 9-22, May 1987.

Krishnamurthy, R. et al, Optimization of Non-recursive Queries, Proceedings of the 12th International Conference on Very Large Data Bases, pp. 128-137, Aug. 1986.

Ibaraki, T. et al, On the Optimal Nesting Order for Computing N-Relational Joins, ACM Transaction on Database Systems, vol. 9: pp. 482-502, Sep. 1984.

Selinger, P.G. et al, Access Path Selection in a Relational Database Management System, Proceedings of ACM SIGMOD Conference of Management of Data, pp. 23-34, May 1979.

Wong, E. et al, Decomposition—a Strategy for Query Processing, ACM Transaction on Database Systems, 1(3) : pp. 223-241, Sep. 1976.

* cited by examiner

QOG representation for table expression $(T \overset{p_{T,R}}{\bowtie} R \overset{p_{R,P}}{\longrightarrow} P) \overset{p_{P,S}}{\longrightarrow} S$. $S_2 = (\{q_P\}, p_{R,P}, \emptyset)$, $S_1 = (\{q_S\}, p_{P,S}, \emptyset)$.
$S_0 = (\{q_T, q_R, S_1, S_2\}, p_{T,R}, \{e_1, e_2, e_3\})$. $V = \{q_T, q_R, q_P, q_S, S_0, S_1, S_2\}$.
$e_1 = (\{q_T, q_R\}, p_{T,R})$, $e_2 = (\{q_R\}, S_2)$, $e_3 = (\{S_2\}, S_1)$.
$E = \{e_1, e_2, e_3\}$.

QOG representation for table expression $T \overset{p_{T,R}}{\bowtie} R \overset{p_{R,P}}{\longrightarrow} (P \overset{p_{P,S}}{\longrightarrow} S)$. $S_1 = (\{q_S\}, p_{P,S}, \emptyset)$, $S_2 = (\{q_P, S_1\}, p_{R,P}, \{e_3\})$, $e_3 = (q_P, S_1)$. $S_0 = (\{q_T, q_R, S_2\}, p_{T,R}, \{e_1, e_2\})$. $V = \{q_T, q_R, q_P, q_S, S_0, S_1, S_2\}$. $e_1 = (\{q_T, q_R\}, p_{T,R})$, $e_2 = (\{q_R\}, S_2)$. $E = \{e_1, e_2, e_3\}$.

QOG representation for table expression $(R \bowtie S) \stackrel{p_{R,A}}{\rightharpoonup}_{oj1} [(A \bowtie B) \stackrel{p_{B,D}}{\rightharpoonup}_{oj2} (C \bowtie D)]$ $S_2 = (\{q_C, q_D\}, p_{B,D}, \emptyset)$, $S_1 = (\{q_A, q_B, S_2\}, p_{R,A}, \{e_2^o\})$, $e_2^o = (\{q_B\}, S_2)$, $e_1^o = (\{q_R\}, S_1)$, $S_0 = (\{q_R, q_S, S_1\}, \emptyset, \{e_1^o\})$ $V = \{q_C, q_D, q_A, q_B, q_R, q_S, S_0, S_1, S_2\}$, $E = \{e_1^o, e_2^o\}$.

QOG representation for table expression $[(R \bowtie S) \stackrel{p_{R,A}}{\rightarrow}_{oj1} (A \bowtie B)] \stackrel{p_{S,D}}{\rightarrow}_{oj2} (C \bowtie D)$ $e_1^o = (\{q_R\}, S_1)$, $e_2^o = (\{q_S\}, S_2)$, $S_1 = (\{q_A, q_B\}, p_{R,A}, \emptyset)$, $S_2 = (\{q_C, q_D\}, p_{S,D}, \emptyset)$, $S_0 = (\{q_R, q_S, S_1, S_2\}, \emptyset, \{e_1^o, e_2^o\})$, $V = \{q_C, q_D, q_A, q_B, q_R, q_S, S_0, S_1, S_2\}$, $E = \{e_1^o, e_2^o\}$.

GRAPHICAL REPRESENTATION OF SEARCH SPACE FOR A SUBPLAN
WHICH IS TRAVERSED USING A DEPTH-FIRST SEARCH PROCEDURE

SYSTEM AND METHODOLOGY FOR GENERATING BUSHY TREES USING A LEFT-DEEP TREE JOIN ENUMERATION ALGORITHM

RELATED APPLICATIONS

The present application is related to and claims the benefit of priority of the following commonly-owned, presently-pending U.S. provisional application(s): application Ser. No. 60/392,479, filed Jun. 29, 2002, entitled "System and Methodology for Generating Bushy Trees Using a Left-deep Tree Join Enumeration Algorithm", of which the present application is a non-provisional application thereof. The present application is related to the following commonly-owned, presently-pending application(s): application Ser. No. 10/249,791, filed May 8, 2003, entitled "Database System with Methodology for Distributing Query Qptimization Effort Over Large Search Spaces". The disclosures of each of the foregoing applications are hereby incorporated by reference in their entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to information processing environments and, more particularly, to a database management system (DBMS) having a methodology for generating bushy trees using a left-deep tree join enumeration algorithm.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information may be retrieved from, or updated in, such files, and so forth, all without user knowledge of underlying system implementation. In this manner, the DBMS provides users with a conceptual view of the database that is removed from the hardware level. The general construction and operation of a database management system is known in the art. See e.g., Date, C., "An Introduction to Database Systems, Volume I and II", Addison Wesley, 1990; the disclosure of which is hereby incorporated by reference.

DBMS systems have long since moved from a centralized mainframe environment to a decentralized or distributed environment. One or more PC "client" systems, for instance, may be connected via a network to one or more server-based database systems (SQL database server). Commercial examples of these "client/server" systems include Powersoft® clients connected to one or more Sybase® SQL Anywhere® Studio (Adaptive Server® Anywhere) database servers. Both Powersoft and Sybase SQL Anywhere Studio (Adaptive Server Anywhere) are available from Sybase, Inc. of Dublin, Calif.

In today's computing environment, database technology can be found on virtually any device, from traditional mainframe computers to cellular phones. Sophisticated applications, whether human resources information systems or sales force automation systems, can "push" much of their complexity into the database itself. Indeed, this represents one of the main benefits of database technology. The challenge, however, is to support these applications, and the complex queries they generate, on small computing devices. At the same time, users expect the productivity and reliability advantages of using a relational DBMS.

One purpose of a database system is to answer decision support queries. A query may be defined as a logical expression over the data and the data relationships set forth in the database, and results in the identification of a subset of the database. Consider, for instance, the execution of a request for information from a relational DBMS. In operation, this request is typically issued by a client system as one or more Structured Query Language or "SQL" queries for retrieving particular data (e.g., a list of all employees earning $10,000 or more) from database tables on a server. In response to this request, the database system typically returns the names of those employees earning $10,000, where "employees" is a table defined to include information about employees of a particular organization. The syntax of SQL is well documented, see e.g., "Information Technology—Database languages—SQL", published by the American National Standards Institute as American National Standard ANSI/ISO/IEC 9075: 1992, the disclosure of which is hereby incorporated by reference.

SQL queries express what results are requested but do not state how the results should be obtained. In other words, the query itself does not tell how the query should be evaluated by the DBMS. Rather, a component called the optimizer determines the "plan" or the best method of accessing the data to implement the SQL query. The query optimizer is responsible for transforming an SQL request into an access plan composed of specific implementations of the algebraic operator selection, projection, join, and so forth. The role of a query optimizer in a relational DBMS system is to find an adequate execution plan from a search space of many semantically equivalent alternatives.

A query optimizer transforms an SQL query into an access plan by generating different join strategies and, based on cost, choosing the best strategy. The process of generating a subspace of the space of all the join strategies is called join enumeration. Since relational databases typically only provide physical operators that can join two tables at a time, a join of a number of different tables (n-way join) must be executed as a sequence of two-way joins, and there are many possible such sequences. The optimizer must typically enu merate some or all of these sequences and choose one based on estimates of their relative execution costs.

In order to optimize a query, a query optimizer must be able to concurrently solve several different problems including: choosing the access method (e.g., sequential scan, index scan) for each base table used in the query; choosing the order in which to join the tables (i.e., the join order), and choosing the join method to be used for each join operation. A complete access plan comprises a join order for joining the relations (tables), join methods for each join operation, and an access method for each base table used in the query.

There are a number of different optimization techniques that are described in the literature. Several of these techniques have been implemented in relational database management system products. Steinebrunn, M. et al in "Heuristic and Randomized Optimization for the Join Ordering Problem", VLDB Journal, (1997) 6: 191–208, divides these optimization techniques into four classes: "deterministic", "randomized", "genetic", and "hybrid". Each class is characterized by a distinct technique for constructing an access plan in the specific search space.

"Deterministic" techniques involve constructing an access plan step-by-step, usually applying some heuristics and pruning techniques to search the solution space. The "Dynamic Programming Algorithm" is a deterministic technique and it is one of the optimization techniques most frequently implemented in database management systems. It was first used in System-R (see e.g., Selinger, P. G. et al, "Access Path Selection in a Relational Database Management System", Proceedings of ACM SIGMOD Conference of Management of Data, pp 23–34, May 1979). Its search space is the space of left-deep processing trees. A left-deep tree is a processing tree that has only base tables or derived tables as the right child for any join. Left-deep trees are desirable because they reduce the need to materialize intermediate results and for several types of join implementations they result in more efficient execution plans.

The Dynamic Programming Algorithm uses an iterative method of constructing the join tree to join a number (n) of relations. It starts by finding all the access methods for a single relation (e.g., index scans and sequential scan). At each iteration, it eliminates all subtrees with cheaper alternatives based on cost and interesting properties such as the ordering property. The algorithm constructs at the kth iteration all solutions that join k tables based on the solutions kept in the (k−1)th iteration. However, one of the major disadvantages of this algorithm is the memory required to store the partial solutions at each iteration. The worst-case complexity of this enumeration process is $O(4^n)$, while $O(n2^2)$ is the complexity of the number of joins enumerated; the number of partial solutions that must be stored in the worst-case is $O(p2^n)$ where p is the number of interesting orderings (see Ono, K. et al, "Measuring the Complexity of Join Enumeration in Query Optimization", in Proceedings of the 16th International Conference on Very Large Data Bases, pp. 314–325, August 1990). Moreover, dynamic programming approaches for join enumeration are notorious for memory utilization as they require the retention of partial access plans. Experiments have shown that the time and memory required by the Dynamic Programming Algorithm are unacceptable for queries with large join degrees.

Several techniques deriving from the Dynamic Programming Algorithm have been proposed. A light-weight implementation of the Dynamic Programming Algorithm which considers the "bushy tree" search space is described by Vance, B. et al in "Rapid Bushy Join-Order Optimization with Cartesian Products", in Proceedings of ACM SIGMOD Conference of Management of Data, pp 35–46, June 1996. As described in greater detail below, a processing tree is called a "bushy tree" if it has composite (i.e., not necessarily base relations) for the left and right children of the join nodes. The lightweight implementation of Vance extends the Dynamic Programming Algorithm to bushy trees by efficiently eliminating the number of partial solutions saved at each enumeration.

A "Minimum Selectivity Algorithm" is a deterministic technique which applies the following heuristic while building the solution trees: a left-deep tree is built step-by-step such that each intermediate result size is the smallest possible. The INGRES database management system implements a version of this algorithm in its decomposition strategy (see e.g., Wong, E. et al, "Decomposition—a Strategy for Query Processing", in ACM Transaction on Database Systems, 1(3): pp 223–241, September 1976, and Kooi, R. P., "The Optimization of Queries in Relational Databases", Ph.D. thesis, Case Western Reserve University, Cleveland, Ohio, September 1980). The Minimum Selectivity Algorithm generates only left-deep trees; at each step, a new relation, which is not already placed in the prefix of the plan, is chosen such that the selectivity of the resulting intermediate relation is the smallest.

A "KBZ Algorithm" is another deterministic technique introduced by Krishnamurthy, R. et al in "Optimization of Non-recursive Queries", in Proceedings of the 12th International Conference on Very Large Data Bases, pp. 128–137, August 1986. The KBZ Algorithm is based on the previous work of Ibaraki, T. et al, "Optimal Nesting for Computing N-relational Joins", in ACM Transaction on Database Systems, 9: pp. 482–502. The KBZ Algorithm computes the optimal solution for a query with no cycle, in $O(n^2)$ time. Hence, the KBZ Algorithm is a polynomial time algorithm. However it has several restrictions and limitations including limitations to the non-cyclic join trees, the cost model of a certain class, and the join methods that can be considered, namely only the join-nested loop joins. The work of Swami, A. et al in "A Polynomial Time Algorithm for Optimizing Join Queries", in Proceedings of the IEEE Conference of Data Engineering, pp 345–354, April 1993, attempts to remove some of the restrictions imposed by the KBZ Algorithm and still retain the complexity polynomial. The technique of Swami can be applied to more than one join method, namely it provides for both sort-merge and join-nested loop joins to be considered.

The "randomized" technique derives join trees by means of so called "moves" that define how a solution tree is obtained from another solution tree. The solution trees are seen as points in the search space and the techniques in this category define different random walks from one solution tree to another solution tree. The "Iterative Improvement Algorithm" is a randomized technique which is based on the fact that a hill-climbing technique will most certainly arrive at a solution that is a local minima in the search space. This technique is presented in the work of Swami, A. et al, "Optimization of Large Join Queries", in Proceedings of ACM SIGMOD Conference of Management of Data, pp 8–17, May 1988; Swami, A., "Optimization of Large Join Queries: Combining Heuristics and Combinatorial Techniques", in Proceedings of ACM SIGMOD Conference of Management of Data, pp 367–376, May 1989; and Ioannidis, Y. E. et al, "Randomized Algorithms for Optimizing Large Join Queries", in Proceedings of ACM SIGMOD Conference of Management of Data, pp 312–321, April 1990.

A "Simulated Annealing" technique discussed in the work of Ioannidis, Y. E. et al, "Query Optimization by Simulated Annealing", in Proceedings of ACM SIGMOD Conference of Management of Data, pp 9–22, May 1987; and Swami, A. et al, "Optimization of Large Join Queries", in Proceedings of ACM SIGMOD Conference of Management of Data, pp 8–17, May 1988, tries to fix the drawback of the iterative improvement algorithm, namely, that the best solution found is a high-cost local minima. The Simulated Annealing techniques allows a move to a neighbor even if the cost of the neighboring solution is higher than the current solution. Heuristics are used to define when such moves are to be considered and how the algorithm ends.

Other randomized techniques have been proposed that randomly probe the search space and stop when a reasonable access plan is found. This class of technique does not use transformations to move from one solution to another, and, therefore, may require less memory than other randomized algorithms (see e.g., Galindo-Legaria, C. et al, "Fast, Randomized Join-order Selection—Why Use Transformations", in Proceedings of the International Conference on Very Large Data Bases, pp. 85–95, September 1994; and Galindo-Legaria, C. "Uniformly-distributed Random Generation of Join Orders", in Proceedings of the International Conference on Database Theory, pp. 280–293, January 1995).

A major challenge in database systems is to significantly reduce the amount of memory required to enable a database system to be run on small computing devices. More particularly, what is required is a solution which enables queries to be effectively optimized while requiring a minimal amount of memory for generating the search space and for storing the information required for query optimization. Ideally, the solution will require that the database system only store enough information to be able to restore the best plans that have been found and the current plan that is being considered during the optimization process. The present invention satisfies these and other needs.

GLOSSARY

The following definitions are offered for purposes of illustration, not limitation, in order to assist with understanding the discussion that follows.

Bushy tree: A processing tree is called a "bushy tree" if it has composite (i.e., not necessarily base relations) for the left and right children of the join nodes. For further description of a bushy tree search space, see e.g., Vance, B. et al "Rapid Bushy Join-Order Optimization with Cartesian Products", in Proceedings of ACM SIGMOD Conference of Management of Data, pp 35–46, June 1996.

Query block: A query block refers to an atomic portion or block of a query that has more than one block because the query contains derived tables, views, and/or subqueries. A query block can be the main block of a SQL SELECT, UPDATE, INSERT, or DELETE statement. A query block can be the main block of a SELECT-FROM-WHERE block (with or without GROUP BY and HAVING clauses) defining a view or a derived table. A query block can also be the main block of a subquery. In "Access Path Selection in a Relational Database Management System", above, Selinger et al define a query block as being "represented by a SELECT list, a FROM list, and a WHERE tree containing, respectively the list of items to be retrieved, the table(s) referenced, and the boolean combination of simple predicates specified by the user". A single SQL statement may have many query blocks because a predicate may have one operand which is itself a query.

Left-deep tree: A left-deep tree is a processing tree that has only base tables or derived tables as the right child for any join. Left-deep trees are desirable because they reduce the need to materialize intermediate results and for several types of join implementations they result in more efficient execution plans. For further description of left-deep processing trees, see e.g., Cluet, S. et al "On the Complexity of Generating Optimal Left-Deep Processing Trees with Cross Products", in Proceedings of the Fifth International Conference on Database Theory, pp 54–67, January 1995.

SQL: SQL stands for Structured Query Language, which has become the standard for relational database access, see e.g., "Information Technology—Database languages—SQL", published by the American National Standards Institute as American National Standard ANSI/ISO/IEC 9075: 1992, the disclosure of which is hereby incorporated by reference. For additional information regarding SQL in database systems, see e.g., Date, C. "An Introduction to Database Systems, Volume I and II", Addison Wesley, 1990, the disclosure of which is hereby incorporated by reference.

SUMMARY OF THE INVENTION

A system and methodology for generating bushy trees using a left-deep tree join enumeration strategy for optimizing execution of a database query is described. In one embodiment, in response to receipt of a query specifying at least one join condition between two or more database tables, each query block comprising an atomic portion of the query is identified and subplans are created for each query block based on grouping portions of each query block. At least one favorable access plan is determined for each subplan of each query block based, at least in part, on estimated execution costs. An optimal access plan for each query block is generated based upon at least one favorable access plan determined for each subplan. A query execution plan is then constructed based upon the optimal access plan generated for each query block.

In another embodiment a method for generating bushy trees during optimization of a database query in a database system comprises: receiving a database query specifying at least one join condition between two or more database tables; identifying each query block within the query, each query block comprising an atomic block of said query; building a query optimization graph for each query block, the query optimization graph including plan nodes representing subplans and quantifiers of each query block; constructing a join tree for each subplan based upon selecting access methods, join methods, and join order for plan nodes of the query optimization graph having favorable execution costs; constructing an optimal access plan for each query block based upon the join tree constructed for each subplan; and generating a bushy execution tree based upon the optimal access plan determined for each query block.

In another embodiment, a method for optimizing execution of a query in a database system is described. In response to a query requesting data from a plurality of database tables, candidate plan segments for inclusion in an access plan for returning data requested by the query are enumerated. The candidate plan segments represent candidate plan nodes, access methods and join methods for inclusion in the access plans. The plan nodes represent subplans and quantifiers. For each query block comprising an atomic portion of the query, determining an optimal access plan by performing the substeps of: placing a candidate plan segment in a partial access plan being generated for the query block; evaluating the partial access plan including the candidate plan segment; if the partial access plan is less favorable than a complete access plan previously identified for said query block, pruning said candidate plan segment; otherwise, adding an additional candidate plan segment to the partial access plan and repeating the above substeps until a complete access plan for the query block is generated; retaining a complete access plan if it is more favorable than other complete access plans previously generated for the query block; and otherwise pruning a complete access plan which is less favorable than other complete access plans. A query execution plan is then generated based upon the optimal access plan determined for each query block.

DETAILED DESCRIPTION OF A PREFERRED EMBODIMENT

The following description will focus on the presently preferred embodiment of the present invention, which is implemented in a desktop and/or server software (e.g., application, driver, or the like) operating in an Internet-connected environment running under a desktop or server operating system, such as the Microsoft® Windows operating system running on an IBM-compatible PC. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

I. Computer-based Implementation

A. Basic System Hardware (e.g., for Desktop and Server Computers)

Figure 1:
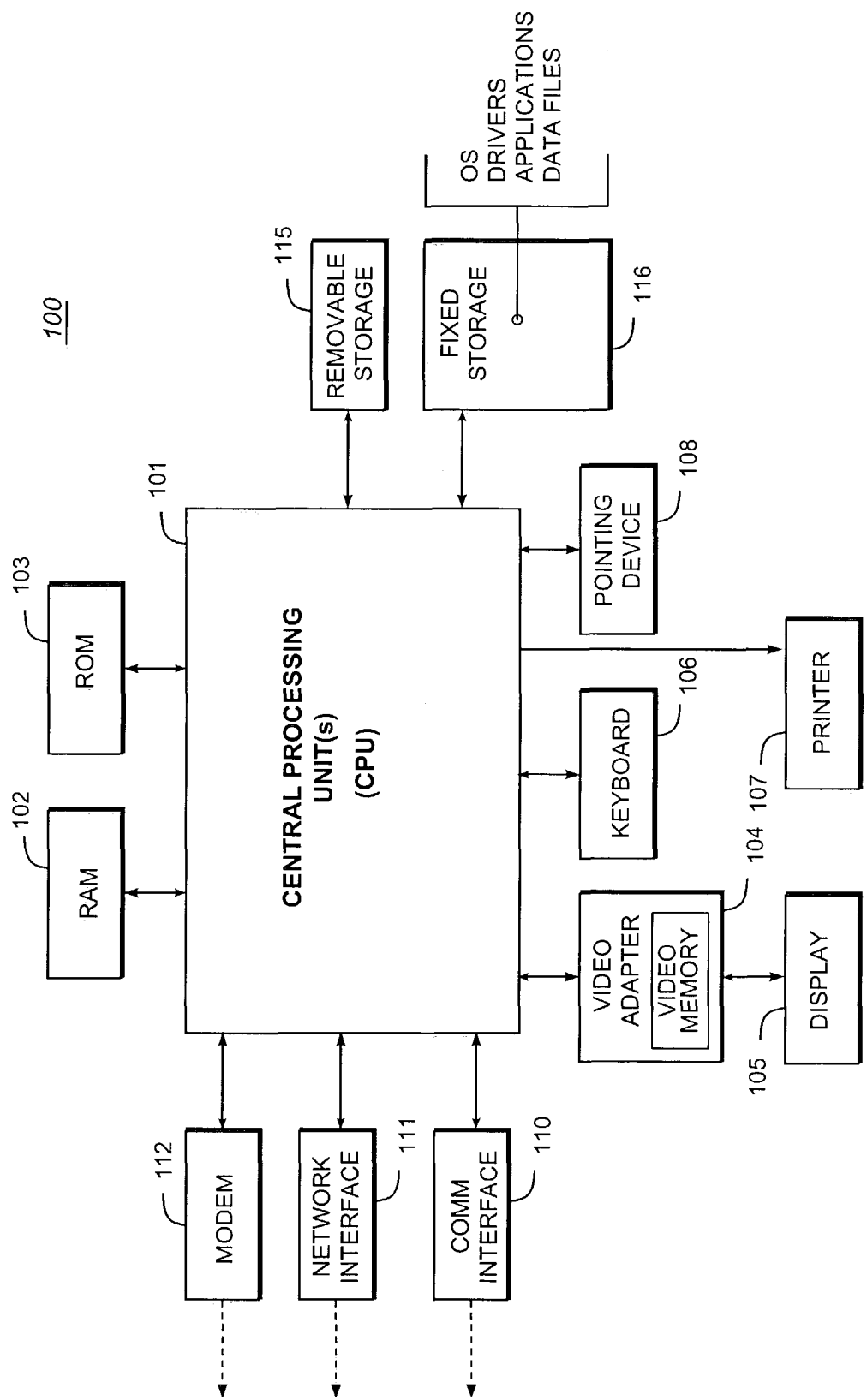
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display device 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
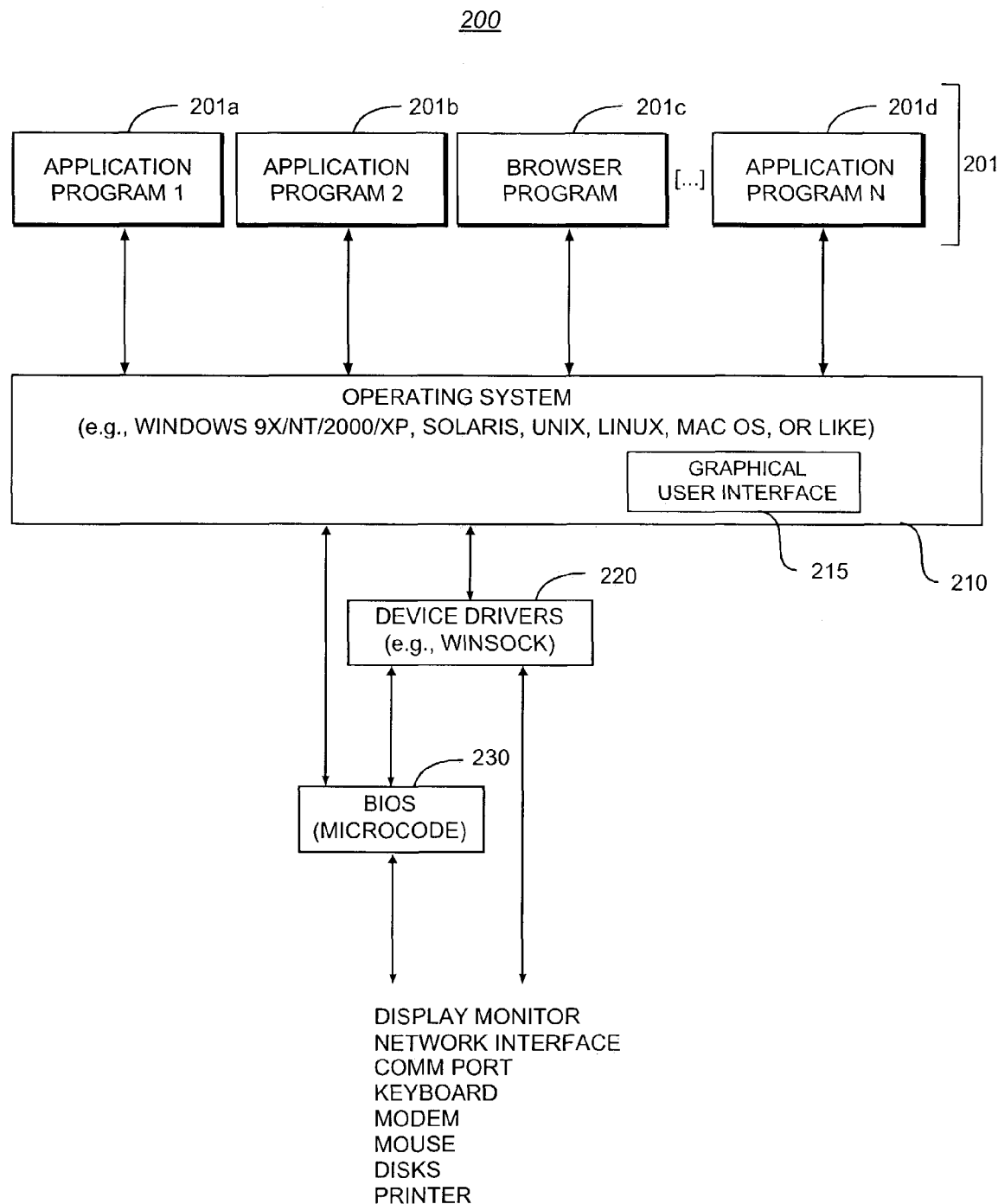
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

C. Client/Server Database Management System

Figure 3:
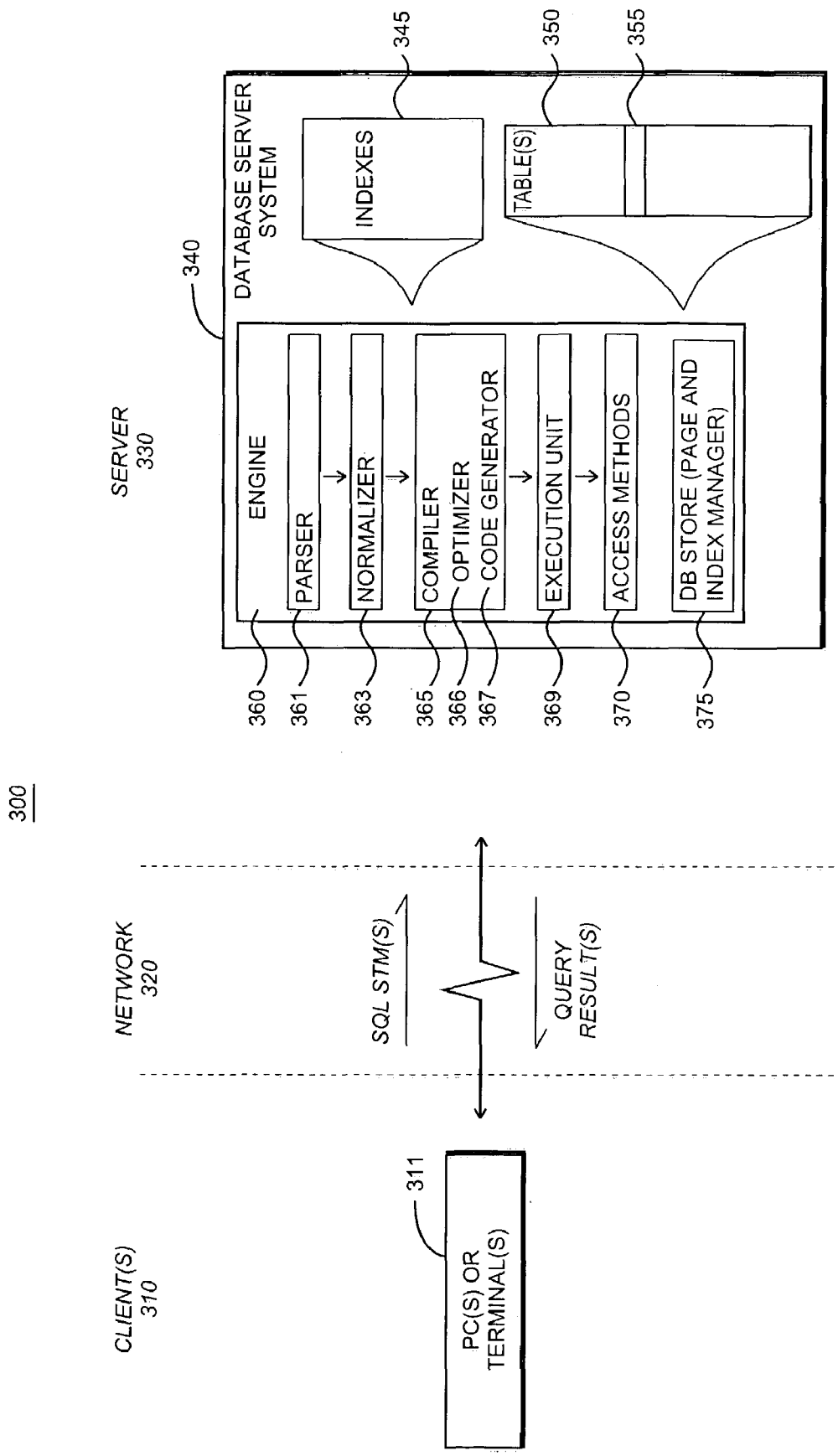
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft Windows client operating system (e.g., Microsoft Windows 95/98, Windows 2000, or Windows XP).

The database server system 340, which comprises Sybase® Adaptive Server® Anywhere (available from Sybase, Inc. of Dublin, Calif.) in an exemplary embodiment, generally operates as an independent process (i.e., independently of the clients), running under a server operating system such as Microsoft Windows NT, Windows 2000, or Windows XP (all from Microsoft Corporation of Redmond, Wash.), UNIX (Novell), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known SQL (Structured Query Language) together with any parameter information into a format (of one or more packets) suitable for transmission across a cable or wire, for delivery to the database server system 340.

Client/server environments, database servers, and networks are well documented in the technical, trade, and patent literature. For a discussion of Sybase-branded database servers and client/server environments generally, see e.g., Nath, A., "The Guide to SQL Server", Second Edition, Addison-Wesley Publishing Company, 1995. Additional documentation describing the operations of Sybase SQL Anywhere Studio version 8.0 (Adaptive Server Anywhere) is available from Sybase, Inc. as "SQL Anywhere Studio 8.0 Collection Documentation" (e.g., at sybooks.sybase.com/awg0800e.html).

In operation, the client(s) 310 store data in, or retrieve data from, one or more database tables 350, as shown at FIG. 3. Typically resident on the server 330, each table itself comprises one or more rows or "records" (tuples) (e.g., row 355), each storing information arranged by columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the client(s) 310 issue one or more SQL commands to the server 330. SQL commands may specify, for instance, a query for retrieving particular data (i.e., data records meeting the query condition) from the database table(s) 350. The syntax of SQL (Structured Query Language) is well documented; see e.g., the above-mentioned "An Introduction to Database Systems". In addition to retrieving the data from Database Server tables, the client(s) also have the ability to insert new rows of data records into the table(s); client(s) can also modify and/or delete existing records in the table(s).

In operation, the SQL statements received from the client(s) 310 (via network 320) are processed by engine 360 of the database server system 340. The engine 360 itself comprises parser 361, normalizer 363, compiler 365, execution unit 369, access methods 370, and DB store (page and index manager) 375. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer can also look up any referential integrity constraints which exist and add those to the query.

After normalization, the query tree is passed to the compiler 365, which includes an optimizer 366 and a code generator 367. The optimizer is responsible for optimizing the query tree. The optimizer performs a cost-based analysis for formulating a query execution plan. The optimizer will, for instance, select the join order of tables (e.g., when working with more than one table); it will select relevant indexes (e.g., when indexes are available). The optimizer, therefore, performs an analysis of the query and determines the best execution plan, which in turn results in particular access methods being invoked during query execution. The operations of the optimizer in generating a query execution plan are described in greater detail below.

For enhancing the storage, retrieval, and processing of data records, the server 330 maintains one or more database indexes 345 on database tables 350. These database indexes 345 facilitate quick access to the data records. A database index, typically maintained as a B-Tree data structure, allows the records of a table to be organized in many different ways, depending on a particular user's needs. An index may be constructed as a single disk file storing index key values together with unique record numbers. An index key value is a data quantity composed of one or more fields from a record which are used to arrange (logically) the database file records by some desired order (index expression). The record numbers are unique pointers to the actual storage location of each record in the database file. Both are referred to internally by the system for locating and displaying records in a database file.

II. Generating Bushy Trees Using Left-deep Join Enumeration Methodology

A. General Process of Query Optimization

Before describing the invention in more detail, it is helpful to describe the overall process of query optimization in the database management system of the currently preferred embodiment. The database management system used in the currently preferred embodiment is version 8.0 of Sybase® Adaptive Server® Anywhere (ASA). Adaptive Server Anywhere is the relational database system that forms the core module of Sybase® SQL Anywhere® Studio, a suite of technologies intended for use in workgroup, mobile, and embedded applications.

Figure 4:
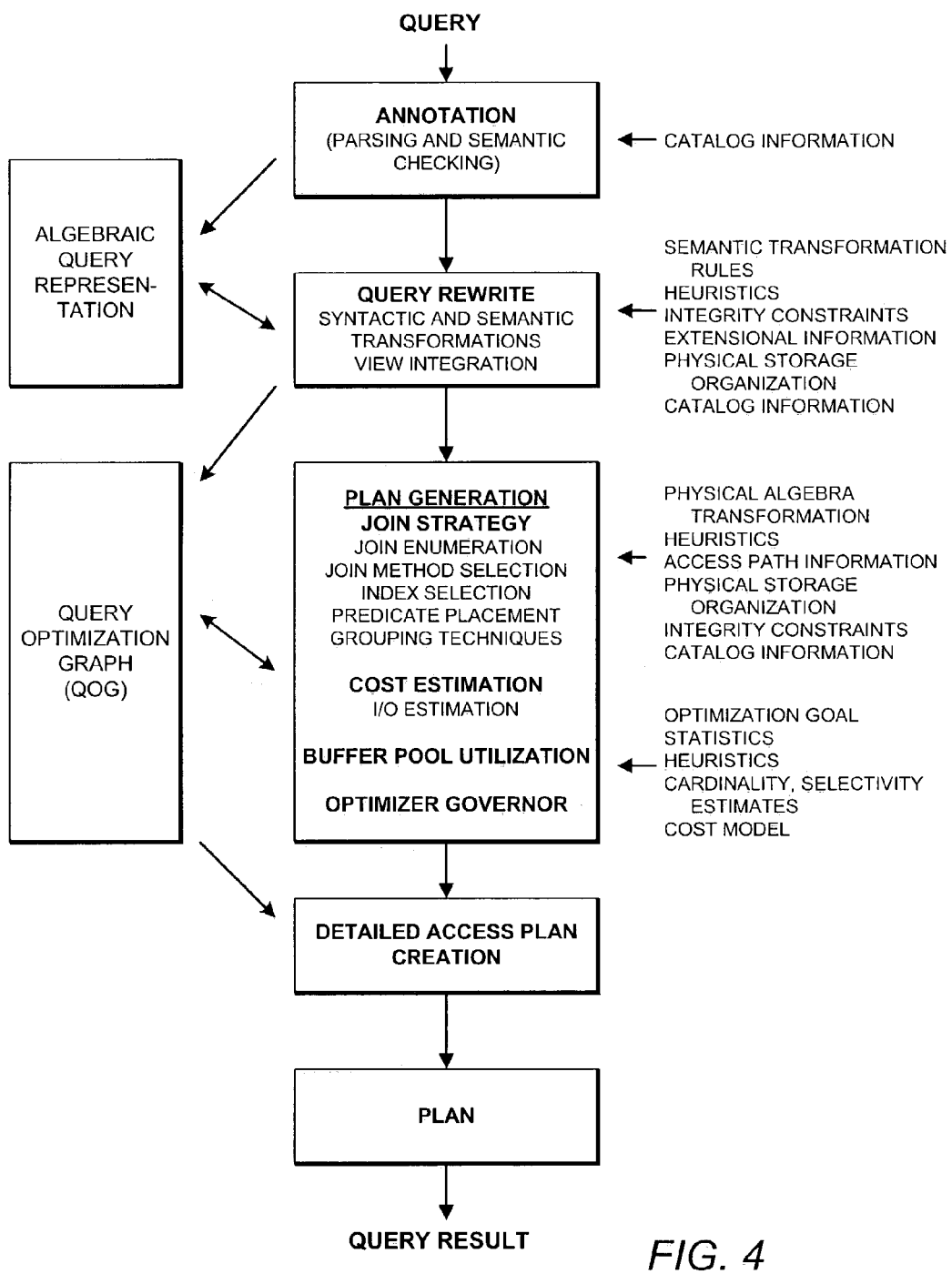
FIG. 4 illustrates the overall process of query optimization in the database system.

FIG. 4 illustrates the overall process of query optimization in the database system of the currently preferred embodiment. As shown, the input to the plan generation phase of the query optimizer is a Query Optimization Graph (QOG), pronounced "cog". A QOG is the internal representation of a query block or Derived Table Block (DTB) as hereinafter described. Each query block is optimized independently in a bottom-up fashion.

Unlike IBM's Starburst optimizer, which separates join enumeration from plan generation and cost estimation (see, e.g., Ono, K. et al, "Measuring the Complexity of Join Enumeration in Query Optimization", above), the optimizer of the currently preferred embodiment combines these processes into a single unified methodology as described in more detail below. As shown at FIG. 4, cost estimation is an integral part of the enumeration method, because it is through comparing the costs of partial access plans that the optimizer can quickly prune significant portions of the search space. The following description will focus on those aspects of the database management system that are helpful for understanding the methodology of the present invention for generating bushy trees using a left-deep tree join enumeration algorithm.

B. Overview

The present invention provides a methodology for generating bushy trees using a left-deep tree Join enumeration algorithm in a relational database system. The methodology efficiently optimizes high join degree queries using a novel approach for generating join trees during query optimization. The optimization methodology of the present invention starts by finding the most favorable access plans for each query block in a bottom up fashion. The generation of join trees is done in a step-by-step manner, combining selection of access methods and join methods for each base relation with join order selection and costing. The methodology of the present invention uses a deterministic branch-and-bound join enumeration method, a cost-based technique for choosing the access methods and join methods, and cost-based pruning methods to efficiently prune the search space. The methodology of the present invention is currently implemented in Sybase® SQL Anywhere® version 8.0 and requires minimal memory for generating the search space and for storing the information required to restore the best access plans.

The optimization of a query block or a "Derived Table Block" (DTB as described below) consists of four phases. In the first phase, rewrite optimizations are applied and a semantically equivalent rewritten query is generated. For example, the nested outer joins are semantically analyzed and transformed into inner joins whenever possible. The second phase includes the building of the Query Optimization Graph (QOG) for each query block. The main objects defined in the QOG and manipulated during optimization are "subplans" and "quantifiers", called plan nodes. For example, the system models the left, right and full outer joins as subplans which correspond to null-supplying sides of an outer join. For each base relation or derived table, a quantifier object is defined in a QOG. Some other key elements built into QOG are arrays of access methods defined for each plan node (for example, relevant indexes for quantifiers ranging over base tables), a join dependency graph, and an index dependency graph. For example, each base table quantifier has its array of access methods defined as a set of relevant indexes consisting of elements modeling table indexes that, based on the sargable predicates, may be used in an Access Plan (AP). In the third phase, a left-deep join enumeration algorithm is applied, in a bottom-up fashion, to each subplan. The algorithm prunes based on the property vector of a generated access plan. The property vector includes properties such as CPU cost, input/output (I/O) cost, order properties, and pipeline characteristics of the intermediate results. In the last phase, the best plan is rebuilt and a Data Flow Operator (DFO) tree is built corresponding to this best plan. Compared with other join enumeration algorithms generating bushy trees, the system and methodology of the present invention requires the use of far less memory.

The optimization methodology of the present invention starts by finding the most favorable access plans for each query block in a bottom up fashion. The generation of join trees for each subplan of a query block is performed in a step-by-step manner, combining selection of access methods and join methods for the plan nodes with join order selection and costing. Pruning is performed by comparing the best complete plan previously found with the current access plan or partial access plan (which may (or may not) contain all the plan nodes). An access plan (also referred to herein as a "prefix") is built by adding plan nodes (or plan segments) one at a time. In other words, at each step a plan segment (i.e., a plan node that is not yet part of the access plan together with an associate candidate access method and join method) is added to the current prefix. The current prefix has all of the join methods and access methods already chosen, and it has a property vector (e.g., cost) already computed. During the optimization process a property vector of the best complete plan found so far is retained. If the current prefix or access plan under consideration is estimated to be less favorable than the cost of the best plan previously found, the current access plan is modified by changing the segment (i.e., plan node, access method, and/or join method) that was added in the last position. The plan node most recently added (i.e., joined) to the current subtree is replaced by a new plan node which has not yet been considered at this position if all access method and join method candidates for the plan node have been considered. Otherwise, the access method and the join method of the last plan node are replaced with other methods not et evaluated that can be selected at the current position in the current access plan.

Unlike the other deterministic algorithms, the current invention combines the costing, the pruning, the enumeration algorithm, and choice of the join methods and access methods in a single optimization process. This optimization strategy makes it possible to store, at any point in the enumeration process, only the information about the best plan that has been found and the current access plan that is being considered. Hence, the memory required by the algorithm is far less than that required, for example, by the above-described Dynamic Programming Algorithm. Moreover, this optimization process can easily be extended with new join methods, access methods, or new types of subplans. For example, to add a new join method it is enough to define how the logical properties (e.g., size of the intermediate result), and physical properties (e.g., cost) of that method are to be computed during the enumeration process.

C. Definition of Terms

Before describing the operations of the present invention in greater detail, it is useful to define certain of the terms used in the following discussion in order to assist in explaining the optimization methodology of the present invention.

Definition 1: A "left-deep tree" is a processing tree that has only base tables or derived tables as the right child for any join. A derived table is a result (often materialized) of a view or table expression containing "UNION", "GROUP BY", "ORDER BY" or "TOP N". Generally, there are n! (n factorial) ways to allocate n base relations to a left-deep tree's leaves. As described by Cluet, S. et al in "On the Complexity of Generating Optimal Left-Deep Processing Trees with Cross Products", in Proceedings of the Fifth International Conference on Database Theory, pp 54–67, January 1995, generating an optimal left-deep processing tree with Cartesian products is an NP-complete problem. An NP-complete problem is any one of a class of computational problems for which no efficient solution has been found. A problem is called NP (nondeterministic polynomial) if its solution can be guessed and verified in polynomial time.

Definition 2: A processing tree is called a "bushy tree" if it has composite (i.e., not necessarily base relations) for the left and right children of the join nodes. This space contains the space of the left-deep trees. For n base relations, the number of bushy trees is equal to:

$$\binom{2(n-1)}{n-1}(n-1).$$

The access plan for a SELECT Derived Table Block (DTB) is generated by a join enumeration operation. The internal representation used by the enumeration operation is Query Optimization hyperGraph (or "QOG"). A base table's DTB is defined for each base table used in a query. A proper derived table's DTB corresponds to a query block such as unflattened subqueries, views, or derived tables. For each proper DTB, a QOG is built that is used by the query optimizer during the query optimization process.

Definition 3: A "quantifier" is an atomic object defined in a QOG. A quantifier is defined for each table (i.e., derived table, base table, view, or subquery) used in the "FROM" clause, for each subquery used in the predicates or "SELECT" list. Hence, a quantifier corresponds to a Derived Table Block (DTB), and each DTB (other than the outermost DTB) has a quantifier ranging over that DTB. A quantifier inherits properties from its underlying DTB, such as the I/O (input/output) cost to generate all of the rows, the size of the relation that a DTB generates, and so forth.

Definition 4: A QOG is a representation of a single Derived Table Block (DTB). A QOG is defined as a hypergraph Q=<V,E> where V and E are defined as follows:

1. V is the set of vertices that can be quantifiers or subplans that are referred to herein as plan nodes. A subplan node is a representation of a subset of plan nodes together with its own edges defined on that subset of plan nodes. Each QOG Q has an outer subplan (hereinafter referred to as Subplan(Q) and usually denoted by $S_O$), which is not nested inside any other subplan. Each quantifier can belong to one and only one subplan. Each nested subplan can belong to one and only one subplan. Subplans are defined for the following table expressions:
   (a) null-supplying side of an outer join, called a "null-supplying" subplan.
   (b) a right hand side or left hand side of a full outer join, called a "full-outerjoin-side" subplan.
   (c) a full outer join, called a "full-outerjoin" subplan.
   (d) a QOG Q, called an "outer" subplan. This subplan is hereinafter denoted as $S_0$ or Subplan (Q) unless otherwise specified.

The subplans are built in a bottom-up fashion such that nested subplans are built before the subplans that they belong to. Each subplan S is a tuple $S=(PN_S, p_S, E_S)$ where $PN_S$ is the set of subplan's plan nodes, $p_S$ is a predicate and $E_S$ is a set of edges defined for the plan nodes in $PN_S$. For each subplan, Quantifiers(S) denotes all quantifiers used by the subplan S or by any nested subplan. If q is a quantifier then Quantifiers(q) is defined as the set {q}. The following "Quantifiers" pseudocode illustrates the method for finding the set of quantifiers used by a subplan:

```
1: Procedure: Quantifiers(S)
2: Purpose: Find the quantifiers used in a subplan.
3: Input:
4:    - A subplan S defined in a QOG Q.
5: Output:
6:    - A set of quantifiers.
7: Notations:
8:    - S = (PN_S, p_S, E_S).
9: begin
10:   Q_s ← ∅
11:   for each plan node pn ∈ PN_S do
12:       if pn is a quantifier then
13:           Q_S ← Q_S ∪ {pn}
14:       else /* pn is a subplan */
15:           Q_S ← Q_S ∪ Quantifiers(S)
16:       fi
17:   od
18:   return Q_S
19: end
```

2. E is a set of directed and undirected hyperedges. There are several types of edges defined in a QOG.

$E^j$: An undirected edge (or join edge) among plan nodes. An undirected edge is represented as (U, p) where U is a subset of V, $U \subseteq V$ and p is a predicate referring to all quantifiers of U. In other words, the schema of p and V has in common the quantifiers defined by U:

sch(p)∩V=∪$_{\{u|u \in U\}}$Quantifiers(u).

$E^o$: Directed edges (or outerjoin edges) are defined for each null-supplying subplan. A direct edge is represented as (U, S) where U is a subset of V, $U \subseteq V$ and S is a subplan in V. For each left outer join, a directed edge exists (U, S), where U is the set of plan nodes in the preserved side and S is the null-supplying subplan defined for this outerjoin. U is referred to as a "preserved hypernode" (see Definition 7 below). Note that the ON condition is part of the definition of the subplan S. The set of quantifiers in Quantifiers(S) is referred to as a null-supplying hypernode (see Definition 6 below).

$E^f$: Bidirected edges (or full-outerjoin edges) are defined for full-outerjoin-side subplans. A bidirected edge is represented as $(S_1, S_2, p_{S1,S2})$ where $S_1, S_2$ are subplans in V corresponding to the left and right children of a full outer join and, $p_{S1,S2}$ is the ON condition defined for this full outer join (see Definition 5 below).

$E^{sj}$: The sargable join edge set $E^{sj}$ consists of directed edges $e^{sj}=(\{q_R\}, V^{expr}, p)$ corresponding to a WHERE or ON predicate p of the form p=R.Xθ expr($R_1, R_2, \ldots, R_n$) where $V^{expr}=\{q_{R1}, q_{R2}, \ldots, q_{Rn}\}$. $V^{expr}$ is the set of quantifiers (local to this DTB) that appear in the right hand side of the predicate; θ∈{<, ≦, >, ≧, =}. If the predicate is an ON conjunct then an edge in $E^{sj}$ is created only if R does not appear on the preserved side of the outer join (this conjunct cannot be used for an index selection if R is in the preserved side of the outerjoin). It should be noted that that the column R.X does not have to be an index column. The set $E^{sj}$ will be used for (1) ordering the set of candidates during enumeration (e.g., the plans without cross products are generated first); (2) index selection; and (3) choosing the join strategies (e.g., merge or hash join selection is based on the existence of some sargable equality join conjuncts).

$E^{sl}$: The sargable local edge set $E^{sl}$ consists of undirected edges $e^{sl}=(\{q_R\}, p)$ for which there exists a sargable local conjunct p on a column of R, p=R.Xθ expr, with expr a constant expression and θ∈{<, ≦, >, ≧, =, IS NULL}.

Several examples will now be discussed to explain the structure of a Query Optimization Graph (QOG).

EXAMPLE 1

For a predicate of the form p=R.X>T.y+Z.w, only one hyperedge is defined in $E^{sj}$: $e=(\{q_R\}, \{q_T, q_Z\}, p)$.

FIGS. 5A–D illustrate Query Optimization Graph (QOG) representations of the several sample table expressions that are described below.

EXAMPLE 2

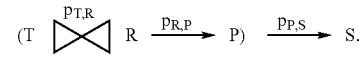

Figure 5A:
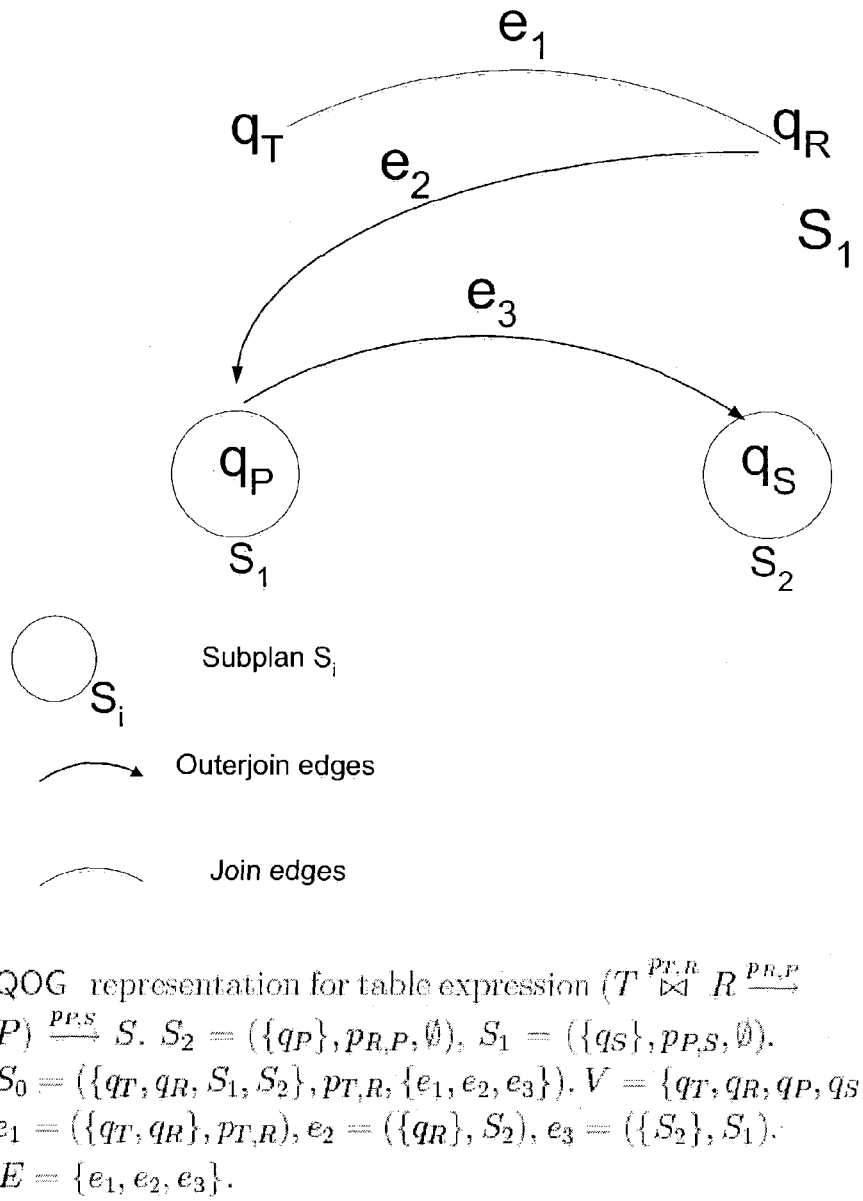
FIGS. 5A–D illustrate Query Optimization Graph (QOG) representations of several sample table expressions.

For the above table expression, the set of quantifiers corresponding to the base tables is $\{q_T, q_R, q_P, q_S\}$. FIG. 5A is a graphical representation of a QOG hypergraph for the table expression shown in this example.

The subplans in V are defined as follows:
$S_2=(\{q_P\}, p_{R,P}, \square)$, $S_1=(\{q_S\}, p_{P,S}, \square)$
$e_1=(\{q_T, q_R\}, p_{T,R})$, $e_2=(\{q_R\}, S2)$, $e_3=(\{S_2\}, S_1$.
$S_0=(\{q_T, q_R, S_1, S_2\}, p_{T,R}, \{e_1, e_2, e_3\})$.

Hence, $V=\{q_T, q_R, q_P, q_S, S_0, S_1, S_2\}$. $E=\{e_1, e_2, e_3\}$. Now consider the following Example 3:

EXAMPLE 3

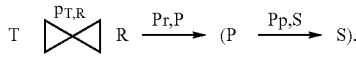

For this Example 3 table expression, the set of quantifiers corresponding to the base tables is $\{q_T, q_R, q_P, q_S\}$. The subplans in V are defined as follows:

$S_1=(\{q_S\}, p_{P,S}, \square)$, $S_2=(\{q_P\}, p_{R,P}, \{e_3\})$ where $e_3=(q_P, S_2)$,
$S_0=(\{q_T, q_R, S_2\}, p_{T,R}, \{e_1, e_2\})$
$V=\{q_T, q_R, q_P, q_S, S_0, S_1, S_2\}$. $E=\{e_1, e_2, e_3\}$, where $e_1=(\{q_T, q_R\}, p_{T,R})$, $e_2=(\{q_R\}, S_2)$.

Figure 5B:
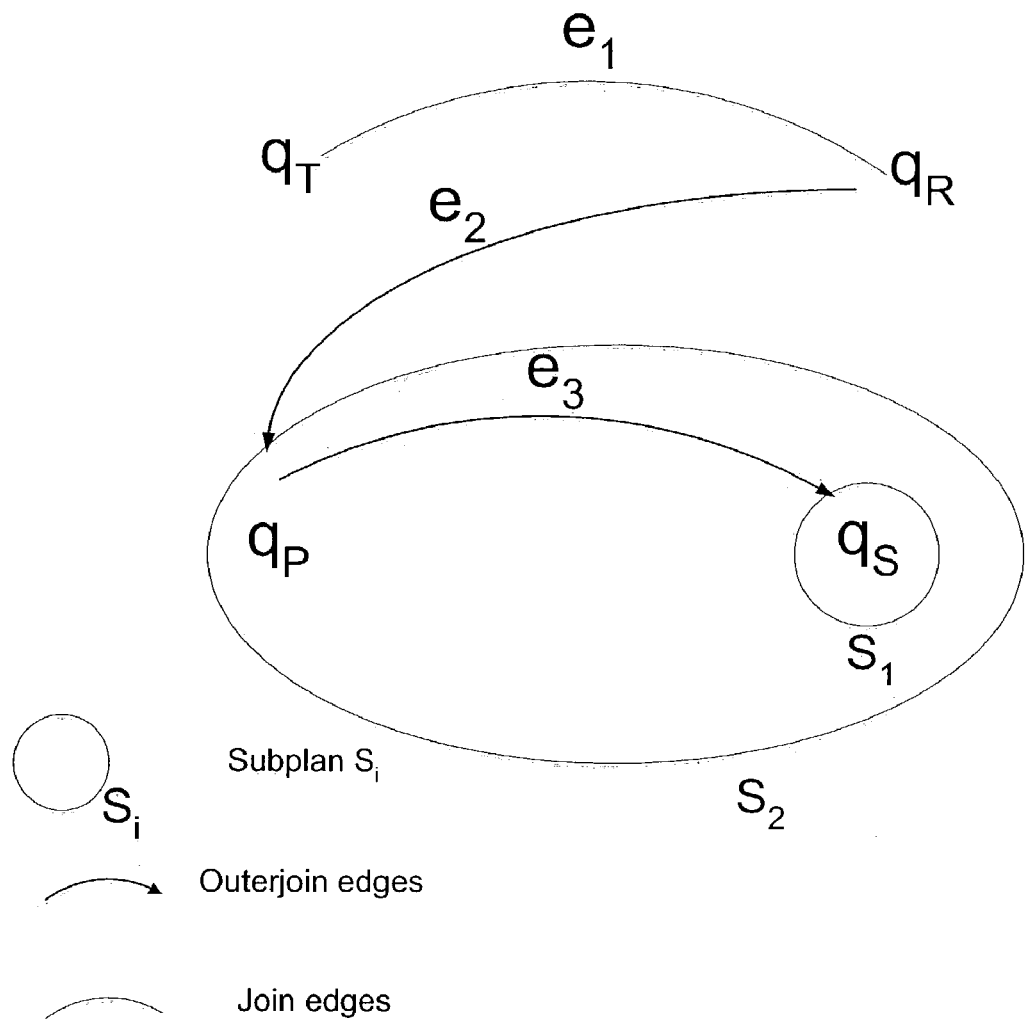

The graphical representation of a QOG hypergraph $Q=<V, E>$ for the above table expression (Example 3) is illustrated at FIG. 5B. Note that the above two table expressions (Example 2 and Example 3) are not equivalent if the ON conjunct $p_{P,S}$ is null-tolerant (e.g., $p_{P,S}=$(P.X IS NULL or P.X=S.X)). This semantic difference is captured in the two very different QOG representations of the two table expressions illustrated at FIG. 5A and FIG. 5B, respectively.

Definition 5: The "full-outerjoin hypernode" of a full outerjoin is the set of all quantifiers that appear in the right hand side or a left hand side of a full outer join (including the quantifiers from the nested outer joins). For each full order join, there are two full-outerjoin hypernodes defined.

Definition 6: The "null-supplying hypernode" of a left outer join is the set of all quantifiers that appear in the right hand side of the left outer join (including the quantifiers from the nested outer joins).

Definition 7: The "preserved hypernode" of a left outer join is the intersection of the set of all quantifiers that are not in the null-supplying hypernode with the set of all quantifiers referenced in the ON conjunct.

Observation 1: Note that a null-supplying hypernode is defined to be exactly the null-supplying side of the outer join according to ANSI. The same is not true for the preserved hypernode; the preserved side of an outer join is defined in ANSI to be the set of all the quantifiers that are not in the null-supplying side. The simplified definition of the preserved hypernode does not affect the ability to correctly find the original table expression.

Axiom 1

For any quantifier $q \in V$, the set $V_q=\{\text{Quantifiers}(S) | \exists S$ a subplan and $\exists e \in E^\circ, e=(U, S)$ such that $q \in \text{Quantifiers}(S)\}$ is totally ordered with respect to the inclusion of sets.

EXAMPLE 4

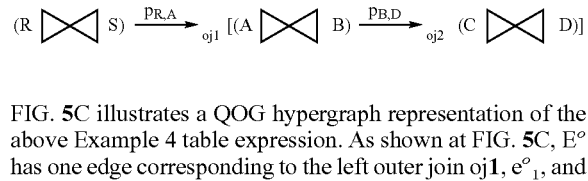

Figure 5C:
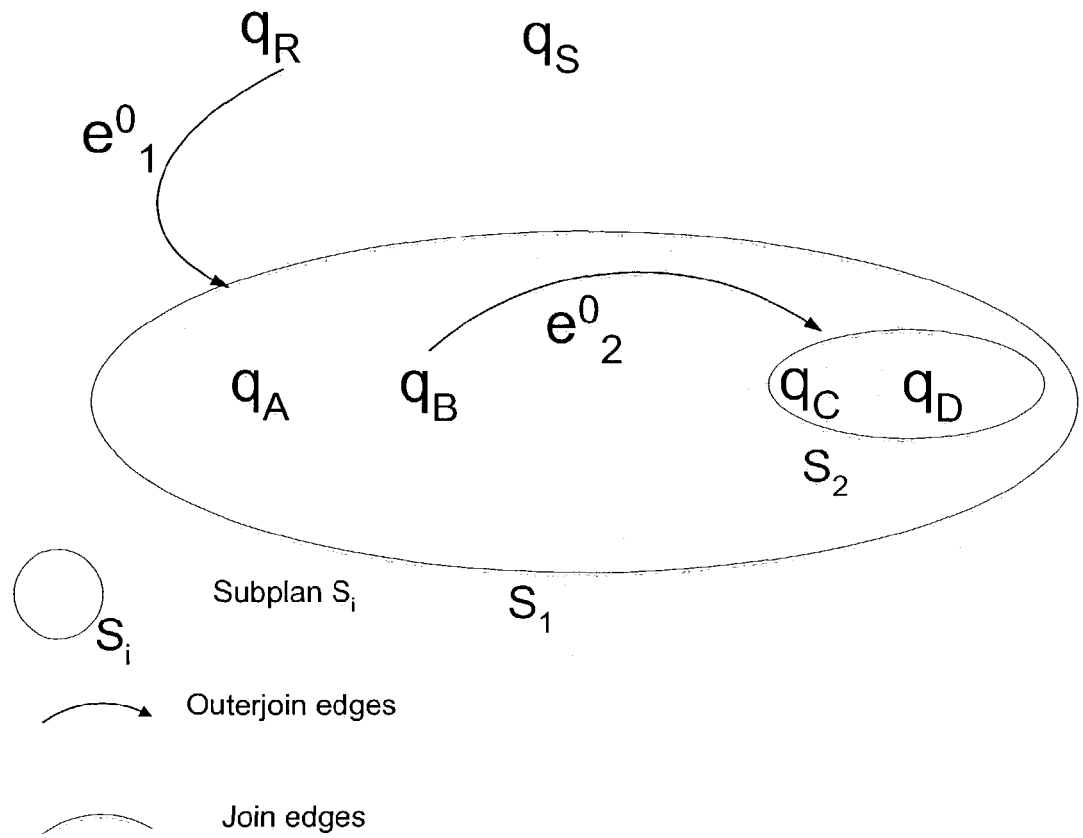

FIG. 5C illustrates a QOG hypergraph representation of the above Example 4 table expression. As shown at FIG. 5C, $E^\circ$ has one edge corresponding to the left outer join oj1, $e^\circ_1$, and one edge to the left outer join oj2, $e^\circ_2$:

$e^\circ_2=(\{q_B\}, S_2)$
$e^\circ_1=(\{q_R\}, S_1)$ where
$S_2=(\{q_C, q_D\}, p_{B,D}, \square)$
$S_1=(\{q_A, q_B, S_2\}, p_{R,A}, \{e^\circ_2\})$ For example, $VqD=\{\{q_C, q_D\}, \{q_C, q_D, q_A, q_B\}\}$ is totally ordered with resp of sets, i.e., $\{q_C, q_D\} \subset \{q_C, q_D, q_A, q_B\}$.

EXAMPLE 5

Figure 5D:
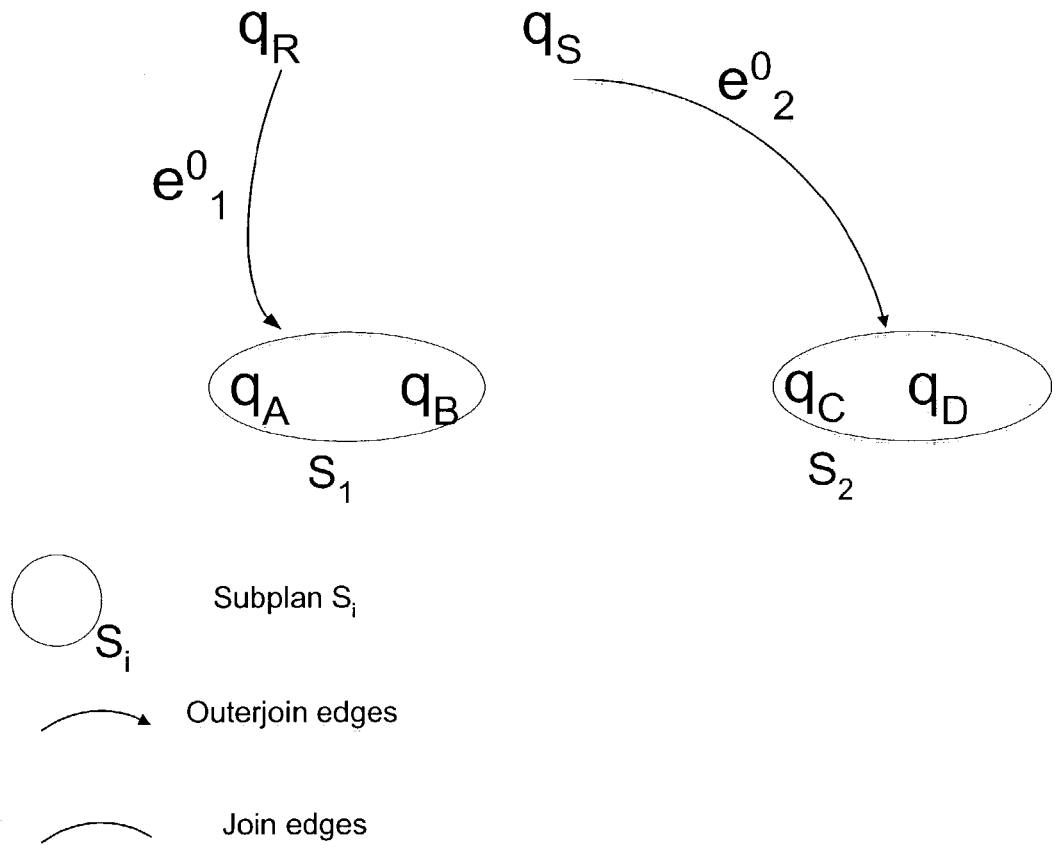

FIG. 5D illustrates a QOG hypergraph representation of the above Example 5 table expression. As shown at FIG. 5D, $E^\circ$ has two edges one corresponding to the left outer join oj1, $e^\circ_1$, and one to the left outerjoin oj2, $e^\circ_2$:

$e^\circ_1=(\{q_R\}, S_1)$
$e^\circ_2=(\{q_S\}, S_2)$
$S_1=(\{q_A, q_B\}, p_{R,A}, \square)$
$S_2=(\{q_C, q_D\}, p_{S,D}, \square)$

EXAMPLE 6

For a predicate of the form p=R.X>(subquery), a hyperedge is defined in $E^{sj}$: $e=(\{q_R\}, q, p)$ where q is the quantifier corresponding to the subquery.

Definition 8

A join method is said to be input independent if and only if the input streams are always generated independently from each other.

The hash join method, for example, is input independent: the building phase reads completely the inner relation, and the probing phase reads tuples from the probing relation which are generated independently from the inner relation. The sort-merge join is also input independent. The nested loops join method and the block nested loops join method are not input independent. For both join methods, a new inner stream is generated for each tuple of the outer relation. The inner stream, in general, depends of the attribute values of the current tuple of the outer relation. For example, if the join predicate is R.X=S.X, where R is the outer relation and S is the inner relation, and an index on S.X is used for the relation S, for each tuple of R the inner stream has only the corresponding matching tuples from the relation S.

The join methods that are input independent have some interesting properties that are explored by a query optimizer constructed in accordance with the present invention:

1. The inner and outer relations may be interchanged. For example, the probing relation for a hash join may be chosen to be any of the two children.
2. None of the input relations depends on the expressions generated by the other input relation (i.e., the right subtree of an input independent join cannot refer to expressions generated in the left subtree and vice versa). This property, for example, restricts the indexes that may be used in the right subtree's base tables.

Conversely, the join methods that are not input independent have the following properties:

a. The inner and outer relations are not interchangeable.
b. The inner relation depends on the expressions generated by the outer relation (i.e., the right subtree may refer to expressions generated in the left subtree). For example, an index scan used for the inner base table of the nested loops join may have the matching predicate referring to the outer relation's attributes.

Definition 9

A plan node object is defined for each quantifier, subplan, and unary operator (such as a sort operator, a materializing operator, or a group by operator).

During the enumeration process, a property vector is set for each plan node. This property vector describes both the properties of the individual plan node in the context of the current partial access plan and the properties of the current partial access plan ending in this plan node. The property vector is used to compare the current access plan with the best plan that has been previously found. A main component of the property vector is the cost estimate associated with a plan node or a partial access plan. Note that each plan node in a partial access plan preserves its property vector while new plan nodes are added to the suffix of the access plan. This technique allows the prefix of an access plan to be reused without computing its properties for the set of all suffixes that the enumeration procedure might generate.

Definition 10: The set of the dependents for a plan node pn defined in a QOG Q, denoted by Dependents(pn), is a set of quantifiers defined as follows:
 1. If pn is a subplan corresponding to a null-supplying side of an outerjoin, then the set of dependents Dependents (pn) is the set of quantifiers in the preserved side of the outer join (see Definition 7 above).
 2. If pn is a subplan corresponding to a side of a full outer join, then the set of dependents Dependents (pn) is the set of quantifiers in the other full outer join hypernode (see Definition 5 above).

Definition 11

The access methods for a plan node are defined as following:
 1. For a quantifier corresponding to a base table's DTB, an access method is defined for each partial index scan that can be built given the sargable predicates of the query, for each complete index scan that can be used to satisfy some interesting properties of the query, and for the sequential scan of the base table.
 2. For a quantifier corresponding to a proper DTB, an access method is defined to represent the best access plan found for that DTB. The access method has the physical and logical properties of the best plan found for that DTB.
 3. For a proper subplan S (see Definition 4), two access methods are defined to represent the two best access plans found for that subplan:
    one access method that can be used with input independent join methods, and is denoted by S<am[□]>; and
    a second access method that can be used with the rest of the join methods (see the "OPTIMIZE SUBPLAN" function described below) is denoted by S<am[Dependents(S)]>.

Definition 12

An access plan of a subplan is an ordered sequence of the subplan's plan nodes, where for each plan node the join method, the access method, the filter, and the prefilter have been set. Each plan node has associated to it a property vector that contains values for logical and physical properties such as I/O and CPU cost, intermediate result sizes, and so forth. Note that because each plan node can be a proper subplan, in accordance with the methodology of the present invention an access plan generally represents a bushy join tree.

Definition 13.

A partial access plan is a prefix of an access plan: $pn_0<am_0>jm_1pn_1<am_1> \ldots jm_kpn_k<am_k>$. The prefix is composed of a subset of the subplan's plan nodes $pn_0$, $pn_1, \ldots pn_k$. The join methods $jm_i$, access methods $am_i$ (e.g., complete index scans, partial index scans, sequential scans, access plans for the proper subplans (see Definition 11)), filters, and prefilters have been set for each plan node in the partial access plan. Each plan node of a partial access plan also contains a property vector describing the prefix ending with such plan node.

The following operations can be applied to a partial access plan during the enumeration procedure:
 1. A new plan node can be added after the last plan node of the prefix such that the new prefix is still a partial access plan. This operation is called "Place". Each Place operation must compute a new property vector for the partial access plan it creates given the property vector of the new plan node added to the prefix and the property vector of the previous partial access plan.
 2. The last plan node can be removed from the prefix such that the remaining prefix is still a partial access plan. This operation is called "Unplace". Because each plan node in an access plan contains the property vector of the prefix ending in that plan node, an Unplace operation does not need to compute the property vector of the partial access plan it creates.

Figure 6:
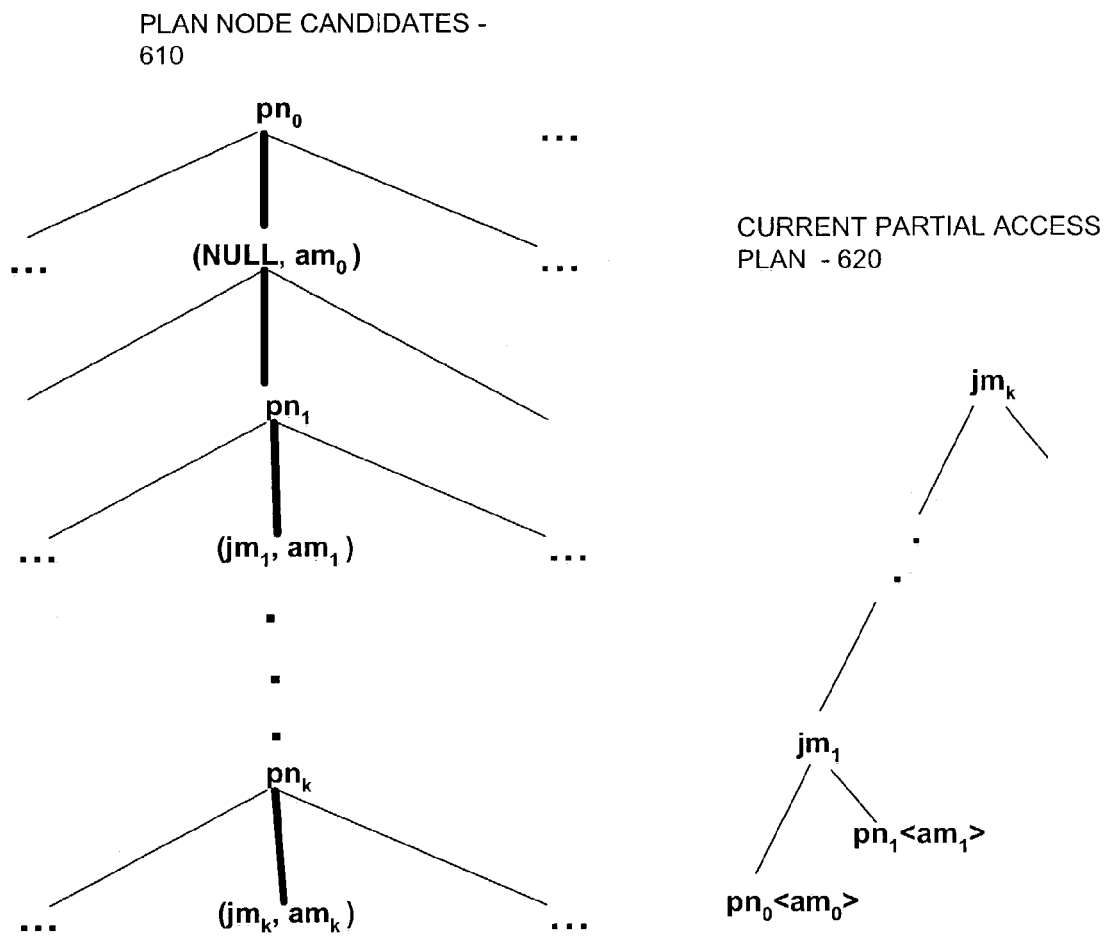
FIG. 6 is a graphical representation of the search space for a subplan which is traversed using a depth-first search procedure.

FIG. 6 is a graphical representation of a subspace of the search space for a given subplan. The search subspace 610 is traversed using a depth-first search procedure. At each step of the depth-first search, next candidates (i.e., plan segments that are candidates for inclusion in the access plan) are dynamically generated, such that, at any time during the enumeration process, the methodology of the present invention only requires storing the following information: (a) information about the current partial access plan; and (b) for each plan node used in the current access plan, information indicating how to generate the next candidates to be considered. The next candidates can be (1) a set of plan nodes; and (2) sets of (join method, access method) pairs as shown at FIG. 6. The next candidates include these two different types of candidates because the methodology of the present invention involves enumerating both what relations are to be added next to the prefix, and how they are added (i.e., choices of access method (e.g., index) and join method). Thus, the next candidates for a given plan node are tuples of the form (join method, access method) (i.e., $(jm_i, am_i)$ pairs). The choices of access method (e.g., index) and join method are dependent on each other to a considerable extent, and for this reason pairs of candidates $(jm_i, am_i)$ are generated together in the currently preferred embodiment instead of selecting them separately (e.g., choosing first the access method and then the join method). The set of candidates is dependent on the prefix of the plan (e.g., a join method requiring an equi-join predicate (for example, hash join) cannot be considered if the equi-join predicate cannot be placed given the current prefix). In the currently preferred embodiment, sets of all access methods (see Definition 11) and join methods that can be used for a plan node are built during a pre-optimization phase. During enumeration, the set of candidates $(jm_i, am_i)$ is selected from these pre-computed candidate sets such that each candidate is valid in the context of the current prefix. If a plan node $pn_k$ is successfully placed in the last position of the prefix, having the join method and the access method chosen to be $(jm_k, am_k)$, then a new set of plan node candidates is computed for this new prefix.

The current partial access plan 620 is shown at the right hand side of FIG. 6. Each $pn_i$ is a plan node that belongs to the subplan and can represent another subplan or a quantifier. A candidate access method of the plan node $pn_j$ is denoted as $am_j$, while $jm_j$ represents a candidate join method that can be used to join $pn_j<am_j>$ with the prefix of the plan. If $pn_j$ represents a proper subplan, the partial access plan containing $pn_j<am_j>$ is in fact a bushy tree.

Consider the following query Q1 shown below as Example 7:

EXAMPLE 7

```
SELECT *
FROM    Nation
        (Customer LEFT OUTER JOIN Order ON C_Custkey = O_Custkey
        AND O_Orderdate < '1995-12-31')
        LEFT OUTER JOIN (Lineitem JOIN Part ON L_Partkey = P_Partkey)
        ON O OrderKey = L_Orderkey AND P_Type = '%TIN%'
WHERE   C_Nationkey = N_Nationkey AND C_Acctbal > 7000 AND N_
        Name = 'EGYPT'
```

Some elements of the QOG for Q1 are defined as follows (excluding here a description of the edges):

```
V = {q_N, q_C, q_O, q_L, q_P, S_0, S_1, S_2}.
S_2 = ({q_L, q_P}, O_OrderKey = L_Orderkey AND P_Type = '%TIN%', ...)
S_1 = ({q_O}, C_Custkey = O_Custkey, ...)
S_0 = ({q_N, q_C, S_1, S_2 }, C_Nationkey = N_Nationkey AND C_Acctbal > 7000
      AND N_Name = 'EGYPT', . . . ).
```

Figure 7:
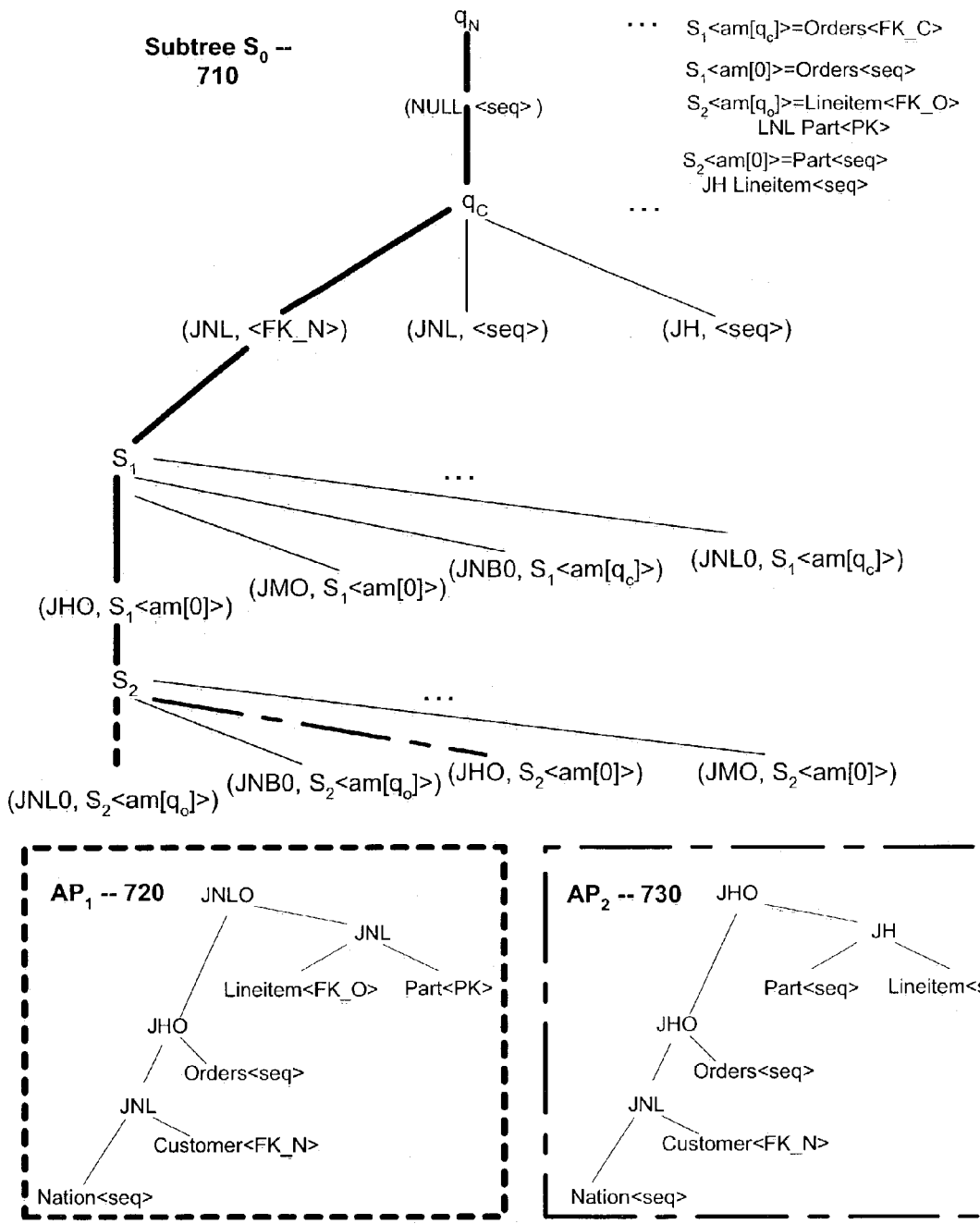
FIG. 7 is a graphical representation of a portion of the search space for a sample subplan which illustrates the optimization methodology of the present invention.

FIG. 7 is a graphical representation of a portion of the search space for a sample subplan $S_0$ for the above query Q1 described above as Example 7 which illustrates the optimization methodology of the present invention. Assume that the access methods for the subplan $S_1$ are:

$S_1<am[\Box]>$=Orders<seq>, and
$S_1<am[q_C]>$=Orders<FK_C>;

and that the access methods for subplan $S_2$ are:

$S_2<am[\Box]>$=Part<seq>J H Lineitem<seq>, and
$S_2<am[q_O]>$=Lineitem<FK_O>JNL Part<PK>.

As shown at FIG. 7, the search space 710 includes the two highlighted paths. These two highlighted paths in the search space represent two access plans for the subplan $S_0$. The first access plan for the subplan $S_0$ is designated AP$_1$ 720 and the second access plan is designated AP$_2$ 730. These two access plans are as follows:

$S_2<am[\emptyset]>$) correspond to the two best plans found for the subplan $S_2$. The methods of operation of the present invention will now be described.

D. Methods of Operation

Figure 8A:
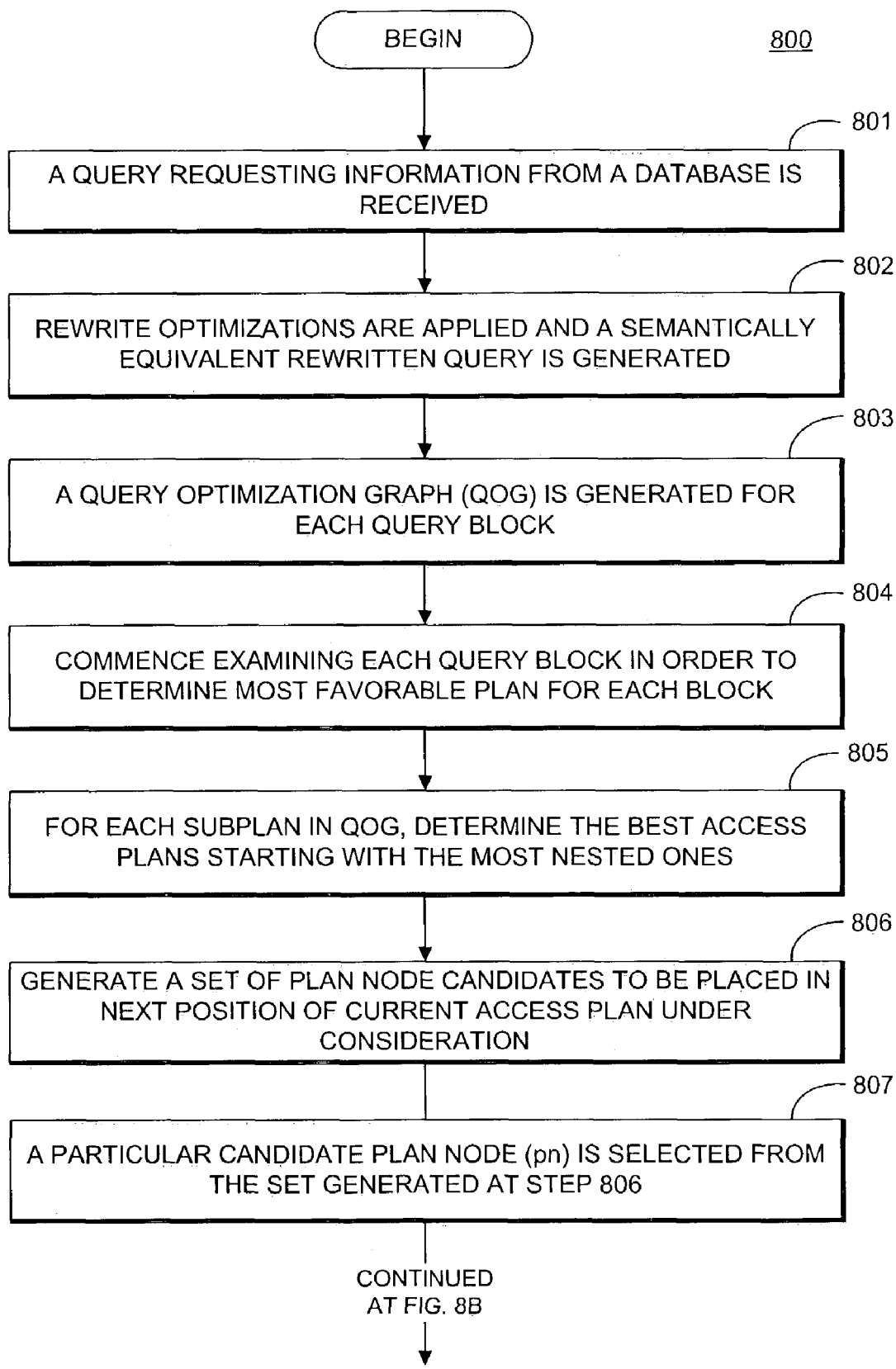
FIGS. 8A–C comprise a single flowchart illustrating at a high level the methods of operation of the present invention in generating bushy trees using a left-deep tree join enumeration algorithm.
Figure 8B:
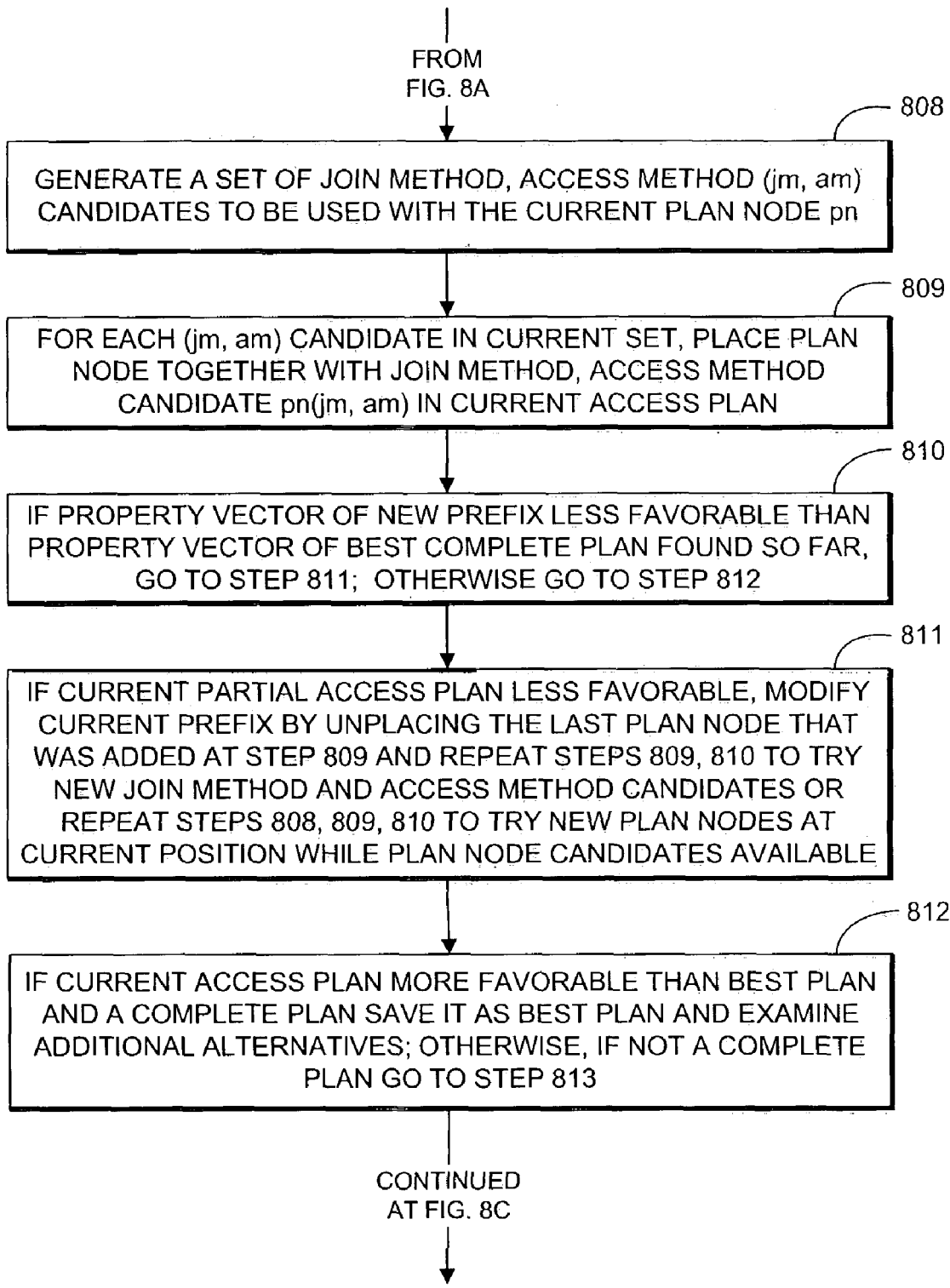
Figure 8C:
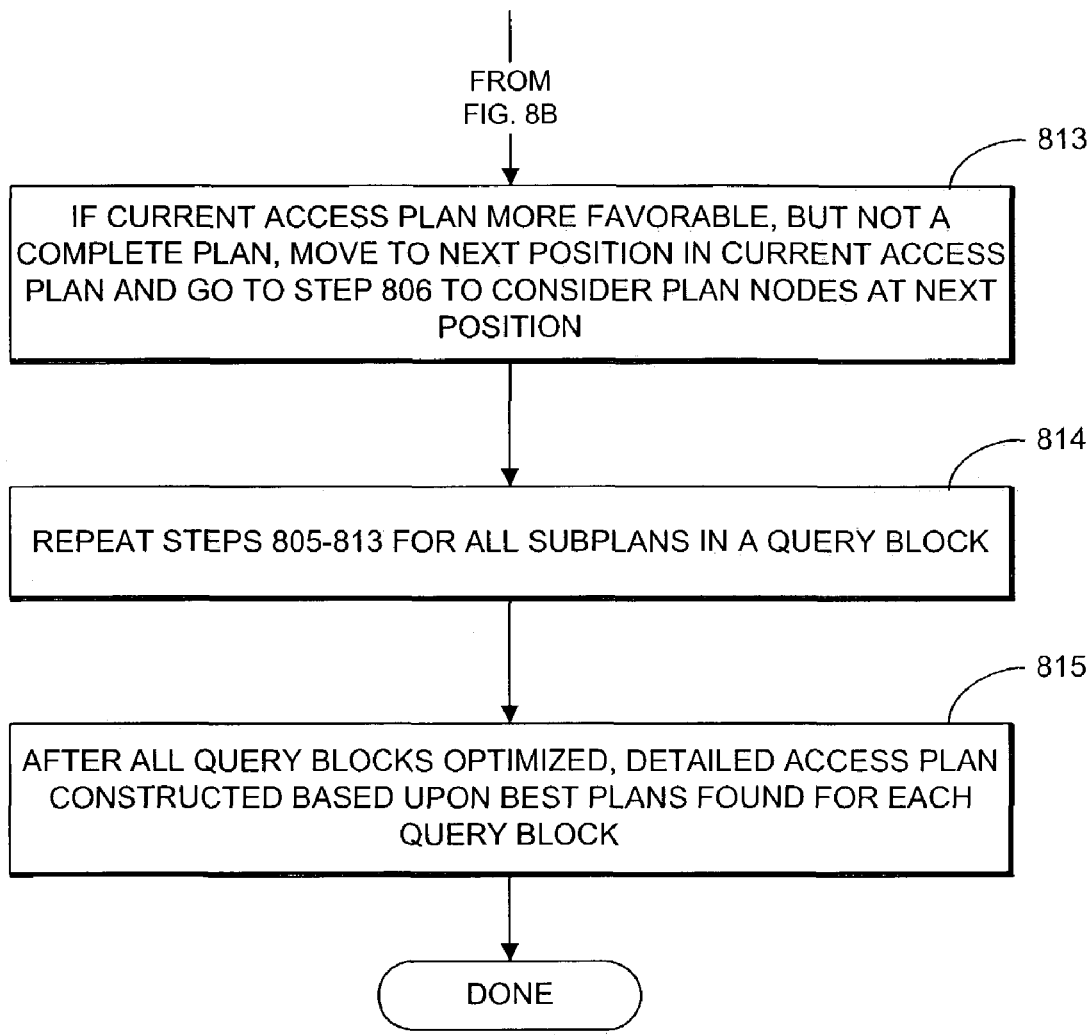

FIGS. 8A–C comprise a single flowchart 800 illustrating at a high level the methods of operation of the present invention in generating bushy trees using a left-deep tree join enumeration algorithm. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

The process commences at step 801 with the receipt of a database query (e.g., a query requesting information from a plurality of database tables). At step 802, rewrite optimizations are applied and a semantically equivalent rewritten query is generated. For example, the nested outer joins are semantically analyzed and transformed into inner joins whenever possible.

At step 803, a Query Optimization Graph (QOG) is generated for each query block or Derived Table Block (DTB). The QOG contains "subplan" objects and also includes arrays of access methods (e.g., relevant indexes), arrays of join methods, a join dependency graph, and an index dependency graph as previously described. In the currently preferred embodiment, all potential join methods

```
    AP_1 = q_N(NULL,< seq >)q_C(JNL,< FK N >) S_1 (JHO, S_1 < am[□] >) S_2 (JNLO,
S_2 < am[q_O] >)
    AP_2 = q_N (NULL,< seq >) q_C((JNL,< FK N >) S_1 (JHO, S_1 < am[□] >) S_2
(JHO, S_2 < am[□] >)
```

Theoretically, the two access plans correspond to the join trees depicted in the two AP inserts AP1 720 and AP2 730 shown at FIG. 7. Note that the access methods for the subplan $S_2$ (i.e., $S_2$ (JNLO, $S_2<am[qO]>$) and $S_2$ (JHO, and access methods for each plan node are also built during this phase.

At step 804, the optimization methodology of the present invention commences the process of examining each query block in order to determine the most favorable access plans for each such query block. This process proceeds with examining each query block in a bottom-up fashion in order to build an access plan for providing data in response to the query. The process of optimizing each query block includes consideration of all the nested subplans as well as outer subplans of a query block. For each subplan in the QOG, determining the best access plans starts with the most nested plans as provided at step 805.

The generation of join trees for each subplan of a query block is performed in a step-by-step manner. A current access plan (also referred to herein as a "prefix") is built by adding plan nodes together with their join methods and access methods to the current prefix that is being considered. In other words, at each step a plan node (e.g., a join with relations that are not yet part of the access plan) is added to the current partial access plan. The current prefix contains the join methods and access methods for all plan nodes that have already been chosen using the methodology of the present invention, and the current prefix is already costed. More particularly, the process is as described below.

At step 806 a set of plan node candidates to be placed in the next position of the current access plan under consideration is generated. Next, at step 807 a particular plan node candidate (pn) is selected from the set of candidates generated at step 806. At step 808, a set of join method, access method (jm, am) candidates to be used with the current plan node pn is generated. Next at step 809, a new access plan is created by adding the candidate plan node pn together with a candidate join method and access method (jm, am) to the current prefix (i.e., "placing" the pn(jm, am) candidate plan segment in the current access plan).

At step 810, the estimated property vector of the new prefix (which may (or may not) contain all the plan nodes) is compared to the estimated property vector of the best complete plan found so far. The estimated property vector includes pipeline characteristics as well as execution costs computed based upon such factors as CPU cost and input/output (I/O) cost. Based upon this comparison, the method proceeds to step 811 if the current prefix under consideration is less favorable than the best plan previously found. Otherwise, if it is more favorable the method proceeds to step 812.

If the current partial access plan under consideration is estimated to be less favorable than the best plan previously found, then at step 811 the current prefix is modified by pruning (or "unplacing") the last plan node that was added in the last position (i.e., the node placed at step 809). In this case steps 809, and 810 are repeated with the examination of new join methods and access methods for a plan node while candidate join methods and access methods (jm, am) are available for the current plan node pn. If all candidate join methods and access methods (jm, am) for a given plan node have been examined, then steps 808, 809, and 810 are repeated while additional candidate plan nodes are available. This process may continue until all plan nodes and their join methods and access methods have been examined at this position. It should be noted that this comparison process may also be interrupted if it is determined that continuing the search of a particular subspace will not improve the best plan previously found or if the effort spent in the current search space exceeds an established threshold as described below.

If the current partial access plan under consideration (i.e., the one built at step 809) has an estimated property vector that is more favorable than the best plan previously found, the current prefix is retained and the method proceeds to step 812 or 813. At step 812, a determination is made as to whether the current access plan represents a complete plan for the subplan currently under consideration. If the current access plan is a complete plan, the plan is retained as the new best plan and the method proceeds with examining additional alternatives while candidates remain available. Otherwise, at step 813 if the current access plan is not a complete plan, the method proceeds to examine the next position in the subtree and returns to step 806 to examine one or more plan nodes for the next positions in the suffix of the current access plan.

This process continues until all portions of the current search subspace have been considered (or until the quota available for considering alternatives is exhausted as hereinafter described). At step 814, steps 805–813 are then repeated for additional query blocks until all query blocks have been optimized. At step 815, after all query blocks have been optimized, a detailed access plan for providing the data requested by the query is constructed based upon the most favorable plans identified for each query block as a result of the foregoing steps.

The methodology of the present invention requires little memory as at any point in the enumeration process only the information about the best plan that has been found and the current partial access plan that is being considered must be stored. Hence, the memory required by is far less than that required by other techniques. The operations of the system of the present invention will now be described in greater detail.

E. Detailed Internal Operation

The process of optimization of a query block or DTB commences with a call to the following "OPTIMIZE DTB" procedure for the root DTB of a query.

```
 1: Procedure: OPTIMIZE DTB
 2: Purpose: Optimize a Derived Table Block (DTB).
 3: Create the Data Flow Operator (dfo) tree representation for
    the root DTB.
 4: Input:
 5: - dtb₀ a parse tree representation of a DTB.
 6: - q₀ the quantifier ranging over dtb₀
 7: Output:
 8: - A dfo execution tree if dtb₀ is the root DTB.
 9:
10: begin
11:     Q ← BuildQOG(dtb₀)
12:     for each quantifier q ∈ Q do
13:         dtb ← DTB(q)
14:         call OPTIMIZE DTB(dtb, q)
15:     od
16:     call OPTIMIZE SUBPLAN(Subplan(Q), Q)
17:     if q₀ is not null then
18:         set the properties of the access plan of q₀, denoted by
            q₀ < seq >, to be the properties of AP_best(Subplan(Q)) [□].
19:         return null
20:     else
21:         dfo ← BuildDFO(Q)
22:         return dfo
23:     fi
24: end
```

As shown at line 11, a Query Optimization Graph (QOG) is built for each Derived Table Block (DTB). The optimization of the DTBs built for the query is performed in bottom-up fashion as illustrated by the call to OPTIMIZE DTB at line 14. After each DTB is optimized, the outer subplan of the root DTB is optimized by a call to "OPTIMIZE SUBPLAN" at line 16. (The "OPTIMIZE SUBPLAN" method is described below). It should be noted that after a nested DTB is optimized, the properties of the best access plan found for the DTB are set to be the properties of the access method for the quantifier ranging over that DTB as provided at line 18 above. For example, if a DTB is a base table DTB, the main access method for the quantifier ranging over that DTB is the sequential scan which has the physical and logical properties set to be the properties of accessing the base table sequentially. If the DTB is the root DTB (the only DTB without a quantifier), the Data Flow Operator (DFO) tree is built for the best plan found by reconstructing, in a bottom-up manner, the best plans found for each nested DTB as provided above at line 21.

The following "OPTIMIZE SUBPLAN" procedure is called by the above "OPTIMIZE DTB" function for each outer subplan of a DTB:

```
1: Procedure: OPTIMIZE SUBPLAN
2: Purpose: Optimize a subplan defined in a QOG.
3: Optimal access plans are found and saved in the following contexts:
4:   (1) all outer references are available; and
5:   (2) none of the outer references is available.
6: Input:
7: - A QOG Q of a DTB.
8: - A subplan S defined in Q.
9: Notations:
10: - Subplans(S) is the set of proper subplans defined for S.
11: - Dependents(S) is the set of outer reference quantifiers
12:   which are referenced by the subplan S.
13:
14: begin
15:   for each subplan node sp ∈ Subplans(S) do
16:       call, OPTIMIZE SUBPLAN(sp, Q)
17:   od
18:   or_availQs ← Dependents(S)
19:   call ENUMERATE(Q, S, or_availQs)
20:   set the properties of the first access method for the subplan S,
       i.e., S < am[or_availQs] >, to be
```

```
21:   the properties of APbest(S) [or_availQs].
22:   if or_availQs == □ then
23:       return
24:   else
25:       call ENUMERATE(Q, S, □)
26:       set the properties of the second access method for the subplan
          S, i.e., S < am[□] >, to be the properties of APbest(S) [□].
27:   fi
28: end
```

The above "OPTIMIZE SUBPLAN" method is not only called for each outer subplan of a DTB, but is also called for each nested subplan as illustrated above at line 16. A subplan which is not an outer subplan is generally optimized twice. Typically, two access methods are set as access methods for that subplan as follows: $AP_{best}(S)[□]$ and $AP_{best}(S)[Dependents(S)]$. Logically each intermediate relation corresponding to a proper subplan can be computed in two ways. First, it can be computed completely in isolation from the rest of the plan nodes defined in the parent DTB as shown at line 25. Second, it can be computed for each tuple generated by the outer reference dependents as provided at line 19. The access method defined by $AP_{best}(S)[□]$ (denoted by S<am[□]>) is used in conjunction with input independent join methods, while the access method defined by the $AP_{best}(S)[Dependents(S)]$ (denoted by S<am[Dependent(S)]>) is used in conjunction with the nested join methods for which the subplan is the inner relation and the Dependents(S) is the outer relation.

The following "ENUMERATE" procedure is called recursively to add a new plan node with its access method and join method to a partial access plan:

```
1: Procedure: ENUMERATE
2: Purpose: Enumerate join trees and set the best access plan for
3: a subplan S when the set of outer reference quantifiers is
4: or_availQs.
5: Input:
6: - A QOG Q of a DTB.
7: - A subplan S defined in Q.
8: - A set of outer reference quantifiers or_availQs.
9: Notations:
10: - APpartial(S) is the current partial access plan defined for S.
11: - APbest(S) [or_availQs] is the best access plan found so far for S
    when the set of available outer reference quantifiers is
    or_availQs.
12: Local variables:
13: - PNc is the set of next plan nodes candidates.
14: - JAMc is the set of <join method, access method> candidates.
15: - prune is set to TRUE if APpartial(S) is less optimal than
    APbest(S) [or_availQs].
16: - c_availQs a set of currently available quantifiers.
17:
18: begin
19:   PNc ← Iterator(FIND NEXT PLANNODES CANDIDATES(Q, S, or_availQs))
20:   for each plan node pn ← Next(PNc) do
21:       c_availQs ← or_availQs ∪ Quantifiers(pn) ∪ Quantifiers
          (APpartial(S))
22:       JAPc ←
23:       Iterator (FIND NEXT JOIN ACCESSMETHOD CANDIDATES(Q, S, pn,
          c_availQs))
24:       for each <join method, access method> candidate < jm, am > ←
          Next(JAPc) do
25:           APpartial(S) ← Place(pn, < jm, am >, APpartial(S))
26:           prune ← Compare(APpartial(S), APbest(S) [or availQs])
27:           if !prune then
```

```
-continued
28:            if AP_partial(S) is complete then
29:                AP_best(S) [or_availQs] ← AP_partial(S)
30:            else
31:                call ENUMERATE(Q, S, or_availQs)
32:            fi
33:        fi
34:        AP_partial(S) ← Unplace(pn, < jm, am >, AP_partial(S))
35:    od
36: od
37: return
38: end
```

One of the input parameters to the above "ENUMERATE" method is the subplan S that is currently being optimized. The information about the current partial access plan, $AP_{partial}(S)$, as well as the best plan found so far, $AP_{best}(S)$ [or_availaQs], is stored in the subplan itself. At line 19 above, plan nodes that are candidates for the next position in the current partial access plan are found through a call to the "FIND NEXT PLANNODES CANDIDATES" function described below.

For each plan node candidate, a set of potential candidates (join method, access method) is generated by calling a "FIND NEXT JOIN ACCESSMETHOD CANDIDATES" function as shown at line 23. A new partial access plan is created by adding the candidate plan segment pn <jm, am> (the candidate plan segment represents a plan node pn with the <jm, am> representing a candidate join method and access method pair) to the current access plan as illustrated at line 25. The "Place( )" function at line 25 computes for the new plan node pn the property vector for the new partial access plan (e.g., number of rows in the intermediate result represented by the current access plan, the cost of the current access plan, and so forth). The cost function used for the cost component of the property vector of a partial access plan is a monotonically increasing function which uses metrics such as buffer pool availability, the number of cached data pages, the properties of the base table indexes, and the like.

The "Compare" function at the line 26 compares the current partial access plan with the best plan previously found. The essence of the branch-and-bound paradigm is the pruning strategy applied when the current partial access plan is considered more expensive than the best complete plan already found: in this case, the last candidate plan node (join method, access method) pair and the search subspace that would have been generated for this partial access plan is abandoned. The "Unplace( )" operation at line 34 restores the last prefix of the current access plan such that a new candidate can be tried. The "Compare( )" function may also be advised by the optimizer governor to abandon a current search subspace if the optimizer governor believes that the search subspace will not improve the best plan previously found or if the effort spent in the current search space exceeds the current quota. The optimizer of the currently preferred embodiment employs an optimizer governor to control the effort spent on plan enumeration. The optimizer governor controls the effort spent on each search subspace by measuring the amount of effort as the number of plan nodes visited, choosing a quota of how many plan nodes the enumeration process visits, and recursively distributing this quota over the search space during enumeration. Hence, even if the current partial access plan is not inferior to the best plan previously discovered, the enumeration process might abandon the current search subspace in favor of trying new subspaces. For further description of the operations of the optimizer governor in controlling the effort spent on join enumeration, see commonly owned co-pending U.S. application Ser. No. 10/249,791 entitled "Database System with Methodology for Distributing Query Optimization Effort over Large Search Spaces", the disclosure of which is hereby incorporated by reference.

The "FIND NEXT PLANNODES CANDIDATES" function which is called by the above "ENUMERATE" function is as follows:

```
 1: Procedure: FIND NEXT PLANNODES CANDIDATES
 2: Purpose: Find a set of plan nodes to be considered next for the
 3: current partial access plan AP_partial(S).
 4: Input:
 5: - A QOG Q of a DTB.
 6: - A subplan S defined in Q.
 7: - A set of available quantifiers availQs.
 8: Output:
 9: - An ordered set of plan nodes candidates.
10: Notations:
11: - AP_partial(S) is the partial access plan defined for S.
12: - PlanNodes(S) is the set of plan nodes of the subplan S
13: - PlanNodes(AP_partial(S)) is the set of plan nodes placed in the
    partial access plan AP_partial(S).
14: - Quantifiers(AP_partial(S)) is the set of quantifiers in the
15: partial access plan AP_partial(S).
16: - sch(p) is a set of local and outer reference quantifiers
    referenced by the predicate p.
17: - Dependents(pn) is the set of the dependents (see Definition 10).
18: Local variables:
19: - CP is a set of plan nodes not connected with AP_partial(S) (i.e.,
20: the plan nodes that will introduce a Cartesian product).
21: - PN is a set of plan nodes.
22:
23: begin
24:    PN ← □
25:    CP ← □
26:    for each plan node pn ∈ PlanNodes(S) \ PlanNodes(AP_partial(S)) do
27:        if Dependents(pn) ⊆ availQs then
28:            if pn has a predicate (p) such that sch(p) ⊆
               Quantifiers (AP_partial(S)) then
29:                PN ← PN ∪ {pn}
30:            else
31:                CP ← CP ∪ {pn}
32:            fi
33:        fi
34:        if PN == □ then
35:            PN ← CP
36:        fi
37:        if PN != □ then
38:            call RankPlanNodeCandidates (PN)
39:            call SortPlanNodeCandidates (PN)
40:        fi
41:    od
42:    return PN
43: end
```

Given the current partial access plan, the above "FIND NEXT PLANNODES CANDIDATES" function computes an ordered array of potential candidates for the next position in the access plan. The "RankPlanNodeCandidates" routine at line 38 uses heuristics to rank each plan node (PN) based on factors which include the size of the relations and the number of join predicates with the prefix of the partial access plan. At line 35, the Cartesian products are deferred as long as there exist candidates that can be joined with the prefix of the plan by checking at line 28 whether any join predicate can be used given the current prefix. After the candidate plan nodes are ranked they are then sorted as illustrated at line 39.

The following "FIND JOIN ACCESSMETHOD CANDIDATES" function is called to generate an array of join method and access method (jm, am) pairs to be used with a current plan node candidate pn:

```
 1: Procedure: FIND NEXT JOIN ACCESSMETHOD CANDIDATES
 2: Purpose: Find a set of <join method, access method> candidates
 3: to be considered for the plan node pn to be placed next to a
 4: partial access plan AP_partial(S).
 5: Input:
 6: - A QOG Q of a DTB.
 7: - A subplan S defined in Q.
 8: - A plan node pn to be placed next in the current partial access
    plan.
 9: - A set of available quantifiers availQs.
10: Output:
11: - JMAMs an ordered set of <join method, access method> candidates.
12: Notations:
13: - AP_partial(S) is the partial access plan defined for S.
14: - PlanNodes(S) is the set of plan nodes of the subplan S.
15: - PlanNodes(AP_partial(S)) is the set of plan nodes placed in the
    partial access plan AP_partial(S).
16: - Quantifiers(AP_partial(S)) is the set of quantifiers in the
17: partial access plan AP_partial(S).
18: - JoinPredicates(jm) is the set of join predicates defined for the
19: join method jm. (Note: all join methods but the Cartesian product
    require at least one join predicate.)
20: Local variables:
21: - JMs is a set of candidates join methods.
22: - AMs is a set of access method candidates for the plan node pn.
23: - preds is a set of predicates.
24: - iiavailQs is a set of quantifiers whose expressions may be used
25: when choosing an access method for the plan node pn for join
26: methods that are input independent.
27:
28: begin
29:     JMs ← □
30:     iiavailQs ← availQs \ Quantifiers (AP_partial(S))
31:     for each join method jm ∈ JoinMethods(pn) do
32:         if jm does not require join predicates then
33:             JMs ← JMs ∪ {jm}
34:         else
35:             preds ← JoinPredicates(jm)
36:             for each p ∈ preds do
37:                 if sch(p) ∩ availQs != □ then
38:                     JMs ← JMs ∪ {jm}
39:                 fi
40:             od
41:         fi
42:     od
43:     JMAMs ← □
44:     for each join method jm ∈ JMs do
45:         if jm is input independent (Definition 8) then
46:             AMs ← FIND ACCESSMETHOD CANDIDATES(QOG, S, pn, jm,
    iiavailQs)
47:         else
48:             AMs ← FIND ACCESSMETHOD CANDIDATES(QOG, S. pn, jm, availQs)
49:         fi
50:         JMAMs ← JMAMs ∪ {(jm, am) | am ∈ AMs}
51:     od
52:     if JMAMs != □ then
53:         call RankJoinAccessMethodCandidates (JMAMs)
54:         call SortJoinAccessMethodCandidates (JMAMs)
55:     fi
56:     return JMAMs
57: end
```

The join methods are valid candidates if they can be used given the current partial access plan. For example, at line 35 a hash join method may be used if and only if at least one equi-join predicate may be placed. In the optimizer of the currently preferred embodiment, all potential join methods and access methods for each plan node are built during a pre-optimization phase. In other words, the set JoinMethods (pn) is already built for the node pn as shown at line 31. For example, if a predicate of the form T.X=R.X is a WHERE predicate, a hash join method with the equi-join predicate T.X=R.X is built for the quantifier corresponding to table T, and a hash join method with the equi-join predicate T.X=R.X is built for the quantifier corresponding to table R. These prebuilt objects allow the enumeration process to quickly generate the search spaces with little effort.

The below "FIND ACCESSMETHOD CANDIDATES" pseudocode illustrates the procedure used for identifying access method candidates:

```
 1: Procedure: FIND ACCESS METHOD CANDIDATES
 2: Purpose: Find a set of access methods candidates
 3: to be considered for the plan node pn to be placed next in
 4: a partial access plan AP_partial(S) when a join method jm is
 5: to be used.
 6: Input:
 7: - A QOG Q of a DTB.
 8: - A subplan S defined in Q.
 9: - A plan node pn to be placed next in the current partial
    access plan.
10: - A join method jm to be used for the plan node pn.
11: - A set of available quantifiers avail Qs.
12: Output:
13: - A set of access method candidates.
14: Notations:
15: - AP_partial(S) is the partial access plan defined for S.
16: - PlanNodes(S) is the set of plan nodes of the subplan S.
17: - PlanNodes(AP_partial(S)) is the set of plan nodes placed in
18: the partial access plan AP_partial(S).
19: - Quantifiers(AP_partial(S)) is the set of quantifiers in the
20: partial access plan AP_partial(S).
21: - GetOptimalAccessMethods(pn, availQs) returns an already found
22: access method for the subplan pn when the available
    quantifiers are the set availQs.
23: - HasMatchingPredicates(idx, availQs) returns TRUE if the
24: relevant index idx may be used (e.g., it has at least one
    matching predicate p such that sch(p) ⊆ availQs.
25: Local variables:
26: - AMs is a set of access method candidates for the plan node pn.
27: - preds is a set of predicates.
28: begin
29:   if pn is a subplan then
30:       AMs ← GetOptimalAccessMethods(pn, availQs)
31:   else if pn is a quantifier then
32:       for each relevant index idx ∈ RelevantIndexes(pn)do
33:           if HasMatchingPredicates(idx, availQs) then
34:               AMs ← AMs ∪ {idx}
35:           fi
36:       fi
37:   od
38: fi
39: return AMs
40: end
```

The above "FIND ACCESS METHOD CANDIDATES" function also relies on pre-built objects in finding the next access method candidates. The set RelevantIndexes(pn) shown at line 32 is built during the pre-optimization phase to include all the partial or complete index scans for a base table that may be useful in the context of optimization of the query. For example, if a predicate of the form R.X>10 is defined in the WHERE clause, and there exists an index I=(R.X ASC) for the table R, then the RelevantIndexes($q_R$) contains a relevant index structure to represent a partial index scan on index I with the sargable predicate R.X>10. If the sargable predicates depend on the prefix of the plan (e.g., R.X>T.X) then a partial index scan can be used if and only if the expressions needed to evaluate the sargable predicates are generated by the prefix of the plan. For this reason, the "HasMatchingPredicates" routine at line 33 checks this property. The set RelevantIndexes(pn) at line 32 also contains complete index scans that might satisfy interesting properties of the query, such as ordering properties required by an ORDER BY clause. For a subplan S, the access methods are pre-computed before the current subplan is optimized (as described above in the "OPTIMIZE SUBPLAN" pseudocode). The function "GetOptimalAccessMethods( )" at line 30 simply recalls these access methods for a proper subplan (i.e., one or both of S<am[Dependent (S)]> and S<am[∅]>).

F. Empirical Results

The current implementation of the ASA optimizer allocates memory for optimizer objects in two ways: the fast heap-based allocation for the optimizer objects; and the stack-based allocation during enumeration for the next candidate arrays. The prebuilt optimizer's objects such as relevant indexes and join methods all use fast heap-based allocations. The arrays of the candidates generated during optimization are allocated on the stack. The following table depicts memory usage for some complex queries with the number of quantifiers for a DTB ranging from 6 to 700. The "Total #Qs" column records the total number of quantifiers built for the whole query. The column "Max #Qs" records the maximum number of quantifiers found in a subplan. The "#DTB(b+d)" records the number of base table DTBs and derived table DTBs built for the whole query. The column "#pn enum" shows the total number of plan segments enumerated during optimization. The columns "Stack(k)" and "Memory(k)" shows the memory usage in kilobytes, stack and heap, respectively, used during optimization process.

| Query | Total #Qs | Max #Qs | #DTBs (b + d) | #pn enum | Stack(k) | Memory(k) |
|---|---|---|---|---|---|---|
| TPCH Q2 | 11 | 9 | 9 + 3 | 1138 | 4.1 | 56 |
| TPCH Q5 | 7 | 6 | 6 + 2 | 3534 | 5.2 | 32 |
| TPCH Q7 | 7 | 6 | 6 + 2 | 1464 | 5.2 | 32 |
| TPCH Q8 | 9 | 8 | 8 + 2 | 7946 | 6.0 | 40 |
| TPCH Q9 | 7 | 6 | 6 + 2 | 5759 | 5.2 | 32 |
| TPCH Q11 | 9 | 6 | 6 + 4 | 66 | 4.1 | 40 |
| TPCH Q21 | 7 | 6 | 6 + 4 | 663 | 5.2 | 40 |
| V1 | 594 | 6 | 371 + 224 |  | 5.4 | 3100 |
| V2 | 911 | 6 | 530 + 382 |  | 5.4 | 4792 |
| V3 | 700 | 700 | 700 + 1 | 13031 | 277.3 | 3996 |

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system, a method for constructing an optimal query execution plan for executing a query, the method comprising:

receiving a query specifying at least one join condition between two or more database tables;

identifying each query block within said query, each query block comprising an atomic portion of said query;

creating subplans for each query block based on grouping quantifiers used in outer joins of each query block;

determining at least one favorable access plan for each subplan of each query block, said at least one favorable access plan determined based at least in part on estimated execution costs; wherein determining at least one favorable access plan for each subplan includes generating at least one access plan for different sets of column references used in the subplan whose tables are outside the subplan;

generating an optimal access plan for each query block based upon said at least one favorable access plan determine for each subplan; and constructing an optimal query execution plan based upon said optimal access plan generated for each query block.

2. The method of claim 1, wherein said step of identifying each query block within said query includes building a query optimization graph for each query block.

3. The method of claim 1, further comprising:
generating a query optimization graph for each query block.

4. The method of claim 3, wherein said step of generating a query optimization graph includes generating subplans for each query block.

5. The method of claim 3, wherein said step of generating a query optimization graph includes generating plan nodes for each subplan, said plan nodes for joining tables and subplans.

6. The method of claim 5, wherein said step of generating a query optimization graph includes generating an array of access methods for each plan node.

7. The method of claim 5, wherein said step of generating a query optimization graph includes generating an array of join methods for each plan node.

8. The method of claim 1, wherein a subplan represents a table expression of a query block.

9. The method of claim 1, wherein the step of determining at least one favorable access plan for each subplan includes the substeps of:
placing a candidate plan segment in a next position in a current access plan being generated, said candidate plan segment representing a particular plan node, access method and join method valid at said next position;

evaluating the current access plan including said candidate plan segment; and if the current access plan is less favorable than a favorable access plan previously identified, replacing said candidate plan segment with another available candidate plan segment and repeating said evaluating substep.

10. The method of claim 9, wherein a plan node comprises a quantifier object.

11. The method of claim 10, wherein said quantifier object represents a base table.

12. The method of claim 10, wherein said quantifier object represents a derived table.

13. The method of claim 9, wherein a plan node comprises a subplan object.

14. The method of claim 13, wherein said subplan object represents a join tree of a table expression of a query block.

15. The method of claim 9, further comprising:
if the current access plan is more favorable than a favorable access plan previously identified, determining whether the current access plan comprises a complete plan;

if the current access plan is determined not to comprise a complete plan, retaining the current access plan and repeating the above substeps for placing a candidate plan segment in a next position of the current access plan; and otherwise, if the current access plan is determined to be a complete plan, retaining the current access plan as a favorable access plan and repeating the above substeps to consider other available alternatives to the current access plan while alternatives are available.

16. The method of claim 9, further comprising:
generating a property vector for said current access plan including said candidate plan segment.

17. The method of claim 16, wherein said property vector includes estimated execution costs for said current access plan.

18. The method of claim 16, wherein said property vector includes pipeline characteristics for said current access plan, wherein said pipeline characteristics describe how results are computed by said current access plan.

19. The method of claim 16, wherein said property vector includes order properties for said current access plan.

20. The method of claim 1, wherein said step of generating at least one favorable access plan for each subplan of each query block includes using a left-deep join enumeration strategy.

21. The method of claim 1, wherein said step of generating at least one favorable access plan for each subplan of each query block includes starting with innermost nested subplans of each query block.

22. The method of claim 1, wherein said step of generating at least one favorable access plan for each subplan includes evaluating execution costs of partial access plans and pruning partial access plans less favorable than previously generated complete access plans.

23. A computer-readable medium having computer-executable instructions for performing the method of claim 1.

24. The method of claim 1, further comprising:
downloading a set of computer-executable instructions for performing the method of claim 1.

25. In a database system, a method for generating a bushy trees during optimization of a database query, the method comprising:
receiving a database query specifying at least one join condition between two or more database tables;

identifying each query block within said query, said query block comprising an atomic block of said query;

building a query optimization graph for each query block, said query optimization graph including plan nodes representing subplans and quantifiers of each query block; wherein said subplans group quantifiers used in outerjoins of each query block;

constructing a join tree for each subplan based upon selecting access methods, join methods, and join order for plan nodes of said query optimization graph having favorable execution costs;

constructing an optimal access plan for each query block based upon said join tree constructed for each subplan; wherein constructing an optimal access plan includes constructing at least one access plan for different sets of column references used in a subplan whose tables are outside the subplan; and generating a bushy execution tree based upon the optimal access plan determined for each query block.

26. The method of claim 25, wherein a query block comprises a selected one of a main block of a Structured Query Language (SQL) statement a main block of a derived table, a main block of a view, a main block of a subquery used in a SQL statement, a derived table, and a view.

27. The method of claim 25, wherein said step of building said query optimization graph includes modeling left outer joins, right outerjoins, and full outer joins as subplans which correspond to null-supplying sides of an outer join.

28. The method of claim 25, wherein said step of generating a query optimization graph includes generating an array of access methods for each plan node.

29. The method of claim 25, wherein said step of generating a query optimization graph includes generating an array of join methods for each plan node.

30. The method of claim 25, wherein said step of constructing bushy join trees for each subplan includes using a left-deep enumeration strategy.

31. The method of claim 25, wherein said step of constructing a join tree includes evaluating execution costs of a candidate plan segment to be added to said join tree being constructed.

32. The method of claim 31, wherein said candidate plan segment comprises a selected plan node together with an access method and a join method.

33. The method of claim 25, wherein said bushy tree comprises a processing tree having composite relations for left and right children of join nodes.

34. The method of claim 25, wherein said step of constructing an optimal bushy access plan includes evaluating execution costs of partial access plans enabling earlier pruning of unfavorable access plans.

35. In a database system, a method for optimizing execution of a query, the method comprising:
receiving a query specifying selection of data from a plurality of database tables;
enumerating candidate plan segments for inclusion in an access plan for selecting data specified by the query, said candidate plan segments representing alternative strategies for joining relations and selecting data;
for each query block comprising an atomic portion of said query, wherein query blocks are associated with subplans that are created based on grouping quantifiers used in outer joins of each query block, determining an optimal access plan for each query block, wherein determining an optimal access plan for each query block includes determining an optimal access plan for each subplan of each query block, by performing the substeps of:
placing a candidate plan segment in a partial access plan being generated for said query block;
evaluating said partial access plan including said candidate plan segment;
if said partial access plan is less favorable than a complete access plan previously identified for said query block, pruning said candidate plan segment;
otherwise, adding an additional candidate plan segment to said partial access plan and repeating the above steps until a complete access plan for said query block is generated;
retaining a complete access plan if it is more favorable than other complete access plans previously generated for the query block; and
otherwise pruning a complete access plan which is less favorable than other complete access plans; and
generating a query execution plan based upon the optimal access plan determined for each query block.

36. The method of claim 35, wherein each said candidate plan segment comprises a plan node, an access method and a join method.

37. The method of claim 36, wherein a plan node comprises a subplan object created based on grouping quantifiers used in outer joins of said query block.

38. The method of claim 36, wherein a plan node comprises a quantifier object.

39. The method of claim 35, where said substep of evaluating said partial access plan includes comparing estimated execution costs of said partial access plan to estimated execution costs of a complete access plan previously generated for said query block.

40. The method of claim 35, where said sub step of evaluating said partial access plan before a complete access plan is generated enables early pruning of less favorable access plans.

41. The method of claim 35, wherein said step of generating an optimal access plan for each subplan of each query block includes starting with innermost nested sub plans of each query block.

42. The method of claim 35, wherein said step of generating an optimal access plan for each query block includes using a left-deep join enumeration strategy.

43. The method of claim 35, further comprising:
generating a property vector for each said partial access plan.

44. The method of claim 43, wherein said property vector includes estimated execution costs for a candidate plan segment.

45. The method of claim 43, wherein said evaluating substep includes comparing said property vector of said partial access plan to a property vector of a complete access plan previously generated for said query block.

46. The method of claim 43, further comprising:
retaining a property vector of a complete plan generated for a query block if said complete plan is more favorable than any other complete access plan previously generated for the query block.

47. The method of claim 35, wherein said substep of pruning said candidate plan segment includes replacing said candidate plan segment with another available candidate plan segment and repeating said evaluating substep.

* * * * *